(12) United States Patent
Simmons

(10) Patent No.: US 8,799,074 B2
(45) Date of Patent: Aug. 5, 2014

(54) METHODS AND APPARATUS FOR PERFORMING ENHANCED QUERIES FOR ITEMS SUCH AS MAPS AND GEOSPATIAL DATA

(75) Inventor: Sean Simmons, Prince George (CA)

(73) Assignee: Goldstream Publishing Inc., Prince George (CA)

( * ) Notice: Subject to any disclaimer, the term of this patent is extended or adjusted under 35 U.S.C. 154(b) by 162 days.

(21) Appl. No.: 13/007,526

(22) Filed: Jan. 14, 2011

(65) Prior Publication Data

US 2011/0173066 A1    Jul. 14, 2011

Related U.S. Application Data

(60) Provisional application No. 61/295,026, filed on Jan. 14, 2010.

(51) Int. Cl.
    *G06Q 30/02*         (2012.01)
    *G06F 17/30*         (2006.01)

(52) U.S. Cl.
    USPC ............................. 705/14.54; 707/3; 707/705

(58) Field of Classification Search
    USPC .................................. 705/14.54; 707/3, 750
    See application file for complete search history.

(56) References Cited

U.S. PATENT DOCUMENTS

| | | | | |
|---|---|---|---|---|
| 5,832,495 | A * | 11/1998 | Gustman | 1/1 |
| 6,016,487 | A * | 1/2000 | Rioux et al. | 707/743 |
| 6,282,540 | B1 * | 8/2001 | Goldensher et al. | 707/724 |
| 6,370,523 | B1 * | 4/2002 | Anderson | 707/724 |
| 6,408,307 | B1 * | 6/2002 | Semple et al. | 707/724 |
| 6,653,948 | B1 * | 11/2003 | Kunimatsu et al. | 340/995.19 |
| 6,748,383 | B1 * | 6/2004 | Nagai et al. | 707/724 |
| 6,772,142 | B1 * | 8/2004 | Kelling et al. | 707/724 |
| 7,747,598 | B2 * | 6/2010 | Buron et al. | 707/705 |
| 2002/0002552 | A1 | 1/2002 | Schultz et al. | |
| 2006/0095331 | A1 * | 5/2006 | O'Malley et al. | 705/22 |
| 2007/0011150 | A1 | 1/2007 | Frank | |
| 2007/0143345 | A1 | 6/2007 | Jones et al. | |
| 2008/0033935 | A1 | 2/2008 | Frank | |
| 2010/0036807 | A1 * | 2/2010 | Lieske et al. | 707/3 |

OTHER PUBLICATIONS

Cai, G., "GeoVSM: An Integrated Retrieval Model for Geographical Information", GIScience 2002, LNCS 2478, pp. 65-79, 2002.
Larson, R.R. et al., "Geographic Information Retrieval (GIR) Ranking Methods for Digital Libraries", JCDL '04, Jun. 7-11, 2004, Tucson, Arizona, USA.

\* cited by examiner

*Primary Examiner* — John G Weiss
*Assistant Examiner* — Dipen Patel
(74) *Attorney, Agent, or Firm* — Oyen Wiggs Green & Mutala LLP

(57) ABSTRACT

Methods and apparatus for cataloguing items such as maps and geospatial data sets store in a database information defining a geospatial region corresponding to each item and a size characteristic of the geospatial area. The database may be queried to identify items of interest by intersecting a search seed comprising one or more geospatial points lines or areas with the areas corresponding to the items. A result set containing items produced by a query may be ordered at least in part according to the size characteristics. In some embodiments the size characteristics comprise square roots of the areas of the geospatial regions.

21 Claims, 19 Drawing Sheets

METHODS AND APPARATUS FOR PERFORMING ENHANCED QUERIES FOR ITEMS SUCH AS MAPS AND GEOSPATIAL DATA

CROSS-REFERENCE TO RELATED APPLICATION

This application claims the benefit under 35 U.S.C. §119 of U.S. application No. 61/295,026 filed on 14 Jan. 2010 and entitled METHODS AND APPARATUS FOR PERFORMING ENHANCED QUERIES FOR ITEMS SUCH AS MAPS AND GEOSPATIAL DATA which is hereby incorporated herein by reference for all purposes as if fully set forth herein.

TECHNICAL FIELD

The invention relates to automated systems and methods for cataloguing, ranking and/or retrieving items that are associated with locations. In some example applications the items comprise maps and/or geospatial data sets.

BACKGROUND

Items such as maps are increasingly catalogued in electronic databases. In addition, more and more maps are becoming available. There is a need for apparatus and methods for locating maps of interest from among the maps included in large collections. Current approaches for searching for maps of interest include text-based searches and map-based searches. Both of these approaches have significant limitations that may result in a map of interest not being retrieved or being buried in a large collection of less-relevant maps. Similar issues occur when attempting to locate other items that are associated with locations. Such other items can include geospatial data sets.

SUMMARY OF THE INVENTION

This invention has a number of aspects that may be applied individually or in combination with one another. Example applications of the technology include:
- stand alone search engines for searching for maps and/or geospatial data;
- systems and methods for identifying and delivering information (which may include advertisements) that is associated with geographical locations;
- systems and methods for cataloguing and/or retrieving maps and geospatial data.

One example aspect provides apparatus for providing a result set to a user. The result set comprises records identifying items each associated with a corresponding geospatial region. The items may, for example, comprise maps or geospatial data sets. The apparatus comprises a ranking facility configured to generate an order for catalogued items of a result set based at least in part on sizes of geospatial regions associated with the catalogued items of the result set. The apparatus may, for example, display indicia corresponding to some or all of the catalogued items of the result set on a computer display in the order established by the ranking facility.

Another aspect of the invention provides apparatus for cataloguing items. The apparatus comprises a database having a record structure for containing records of catalogued items. The record structure comprises at least a first field adapted to contain geospatial data defining geospatial regions associated with corresponding catalogued items and a second field adapted to contain size information characterizing the geospatial regions. An interface is provided for entering item data associated with an item to be catalogued, the item data including the geospatial data corresponding to the item. The apparatus comprises a facility configured to determine the size information from the geospatial data and to store the size information in the second field of a record corresponding to the item to be catalogued.

Another aspect of the invention provides apparatus for retrieving records corresponding to items from a database. The apparatus comprises a database having a record structure containing records of catalogued items. The record structure comprises a first field containing geospatial data defining geospatial regions associated with corresponding catalogued items. A query engine is configurable to perform a query on the database to obtain a result set comprising records of at least some of the catalogued items. The query may comprise a geospatial query. A ranking facility is configured to generate an order for the catalogued items of the result set based at least in part on sizes of the geospatial regions associated with the catalogued items of the result set.

Another aspect of the invention provides machine-implemented methods for providing a result set to a user. The result set comprises database records. The records identify items each associated with a corresponding geospatial region. The method comprises, in a programmed computer: obtaining the result set; determining an order for the items in the result set based at least in part on sizes of the corresponding geospatial regions; and displaying the result set to the user on a computer display with the items ordered in the determined order.

Another aspect of the invention provides methods for cataloguing items in a database. The methods comprise, for each item: associating a geospatial region to the item; based at least in part on the area of the geospatial region, assigning a value to the item; and storing information defining the geospatial region and the value in a record corresponding to the item in a database.

Further aspects of the invention and features of specific embodiments of the invention are described below.

BRIEF DESCRIPTION OF THE DRAWINGS

The accompanying drawings illustrate non-limiting example embodiments of the invention.

DESCRIPTION

Figure 1:
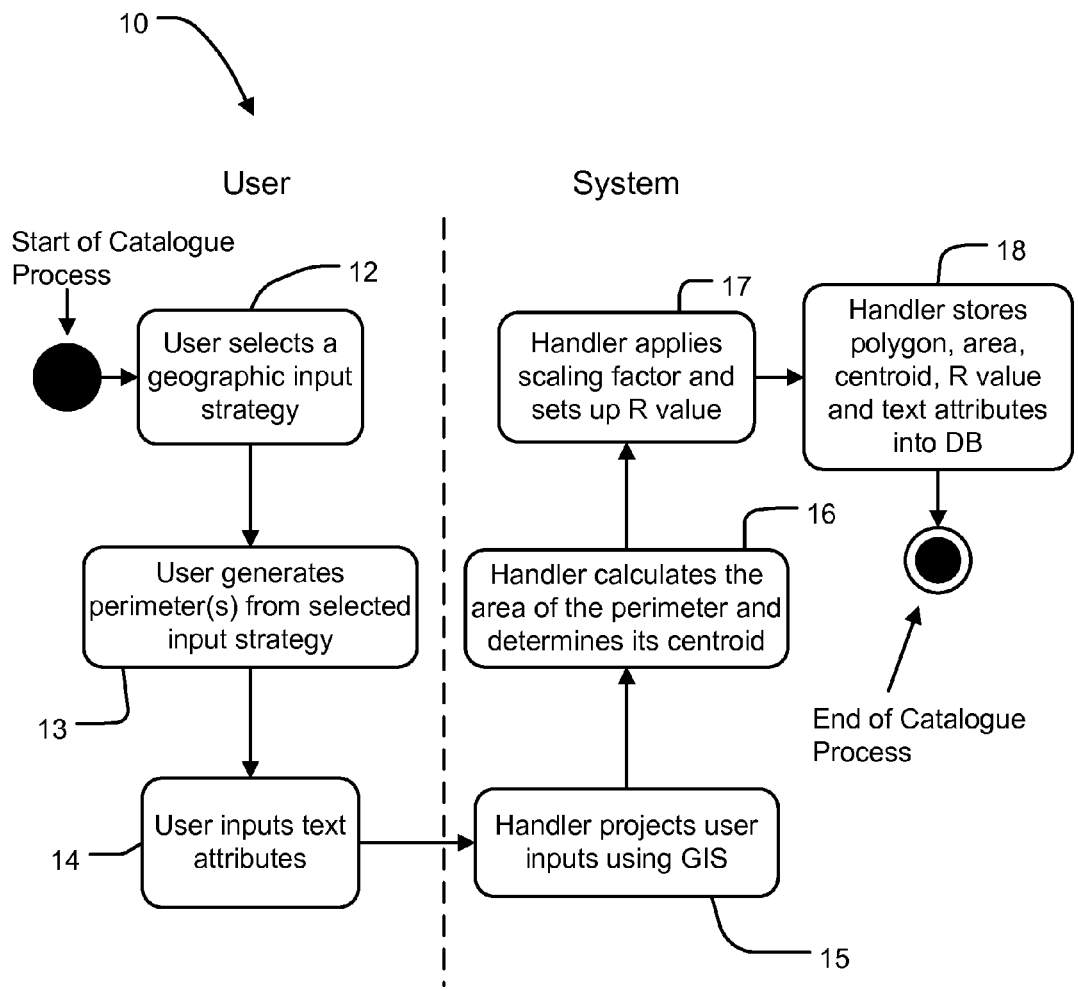
FIG. 1 is a flowchart illustrating an example method for cataloguing items such as maps.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

DEFINITIONS

Map: In general, map means any geographic representation. Examples of maps include topographical maps, street maps, tourist maps, special purpose maps such as recreation maps, hunting maps and fishing maps, mineral maps, forestry maps, nautical charts, and historical maps. Maps may be in tangible form (e.g. printed on paper or some other substrate) or electronic form.

Geospatial Data: Geospatial data means data that has a geographic origin and includes information specific to locations. Geospatial data may include map data as well as other location-dependent information. Geospatial data may be used to place or locate the features on a map. Whereas the scale of a map may dictate resolution of the features shown on the map, geospatial data is not constrained in the same way as maps.

One aspect of this invention provides machine-implemented apparatus and methods for identifying and ranking items such as maps and/or geospatial data. The apparatus and methods receive a query that comprises information identifying at least a location or a specific area and produce a listing or other set of maps and/or geospatial data that is most pertinent to the query.

In an example embodiment, a machine-implemented method performs a search in a database containing records of maps and/or geospatial data sets and ranks results of the search based at least in part on a location associated with a query. The method obtains user input specifying or otherwise identifying a geographical location, path or area (collectively 'geographical information'). The input may be received, for example, by any of:
  detecting a location corresponding to a point on which a user clicks on a map displayed on a graphical user interface;
  detecting an area corresponding to an area identified by a user using a graphical user interface;
  receiving coordinates identifying a location or area from a user or a user device;
  retrieving a location associated with a user or other entity in a social network (such as Facebook™ or MySpace™);
  looking up coordinates of a location based upon user input (for example, the name of a city, geographical feature, address, or the like);
  allowing a user to select a location from a list of locations;
  identifying a location associated with an item selected by a user;
  identifying a path or line corresponding to a geographical feature selected by a user (e.g. a river, highway, railway line, divide, border, boundary or other linear feature);
  allowing a user to enter a line or path using a graphical user interface;
  receiving GPS or other location coordinates from a user device equipped with a GPS or other location-finding technology;
  etc.

The seed may originate, for example from any of a wide range of sources such as:
  a web based interface;
  a mobile device such as a mobile telephone or any other device/platform that can supply the co-ordinate locations; or
  a stand-alone web site, such as The Angler's Atlas™, a social networking site like Facebook™, or a mobile device, such as an iPhone™.

The method generates a search seed based on the location or area (in some embodiments the location or area is used directly as a search seed—the search seed may comprise, for example, coordinates of a location or a set of coordinates such as a defined area or line). The method compares the search seed to geographic locations associated with items in a catalogue to yield a result set. In some embodiments, the comparison is performed by a machine such as a programmed computer which automatically compares the search seed to computer-readable information specifying geographic locations associated with electronic records corresponding to items in the catalogue.

Some embodiments comprise generating from a search seed a sequence of larger areas for use as search seeds. Such embodiments can be useful for obtaining complete search results.

In searches according to any embodiment, queries may include additional criteria which may be applied to further limit search results. For example, a search may be limited to items of specific types, cost ranges, publishers, words in titles, authors, keywords, etc. This may be achieved, for example, based on user-generated text strings or other input. Such data may be applied to filter items which do not match the additional criteria from the result set. In some embodiments users may supply preset criteria such as specific text strings, map categories or the like. Search results for the users may be filtered to match the preset criteria as well as the search seed. Allowing users to supply such preset search criteria can allow the users to refine the results of searches and makes it easier for repeat users to conduct searches that provide the results in which they are interested.

The items in the result set may be ordered based on a ranking method. Ranking methods according to some example embodiments are described below.

In some embodiments, catalog records in a database correspond to items. Each catalog record includes machine-readable information identifying a location or area associated with the corresponding item. Executing a query to locate a set of items satisfying the query comprises performing an intersect operation that compares the location or area associated with the search seed to the locations or areas associated with the items. Such comparison may be made to identify those catalogue records associated with locations or areas that overlap with the location or area corresponding to the search seed of the query. The result set may contain zero or more items. The result set may comprise, for example, a set of catalogue records, a set of pointers or other information specifying a set of catalogue records, or the like. If the result set contains two or more items then the items may be ranked in an order that tends to cause more relevant items to be ranked more highly than less relevant items.

Where the search seed comprises a path or line (e.g. a polyline), the result set may include all items associated with locations or areas that overlap with the line. Where the search seed comprises an area (e.g. a polygon), the result set may include all items associated with locations or areas that overlap with the area.

A result set may be provided to a user in various ways. For example, the result set may comprise: a printed (or displayed or stored) list (in which rank may be indicated, for example, by the order of items in the list); or, display of indicia representing items (in which case rank may be represented, for example, by a degree of highlighting, relative locations of the indicia, colour, brightness, or the like). In some embodiments, only a highest-rank subset of the result set is initially provided, thus avoiding confusing the user with a potentially large number of less relevant items. In some embodiments the indicia representing items comprise hyperlinks configured to link to information about the items, images of the items, and/or a facility of accessing and/or ordering the items.

In some embodiments, ranking is performed based at least in part on a scale associated with items. The following example describes ranking based on an 'R-value'. An R-value is a measure derived from the surface area of a map. In an example embodiment, the R-value is given by:

$$\text{``}R\text{-value''}=\sqrt{A} \qquad (1)$$

where A is the area covered by each map in suitable units. In embodiments where the items in the catalogue have geospatial volumes, R-values may be derived from the geospatial volumes.

A simple query based on coordinates of a location (e.g. latitude and longitude values) returns a set of items associated with areas or locations that overlap with the query location. The items in the result set may be ranked in ascending order, based on their R-values. It can be appreciated that this will cause maps or other items that are specific to the query location (i.e. are associated with relatively small areas which overlap with the query location) to be ranked at the beginning of the ranked result set whereas items that are less specific to the query location will be ranked later in the ranked result set.

It is common that multiple items may have the same R-value. This can occur, for example, where multiple items share a common boundary, such as an administrative boundary. Where multiple records have the same R-value, the records may be sorted in any suitable manner, for example according to:
 alphabetic order of the titles;
 price;
 a numeric order based on the catalogue number;
 vendor;
 a secondary geographic location associated with the item (e.g. where the item is a printed map, a location of the place where the printed map is physically situated);
 date of the item (e.g. file date);
 some combination of these;
 etc.
In some embodiments the sort order for records having the same R-value is user-selectable.

In some embodiments, the R-values for some or all items are adjusted to take into account the resolution of the item. The resolution may, for example, be given by the scale of a map or the distances between points in a set of geospatial data. One way in which this can be implemented is to define R-values according to:

$$\text{`}R\text{-value'}=\sqrt{A} \times S \qquad (2)$$

where S is a scale factor.

Including a scale factor is particularly valuable in cases where the items comprise sets of geospatial data which may both cover large areas and have high resolutions (or more generally, have resolutions that are not directly related to the areas covered). For example, Navionics™ markets a Canada-wide HotMaps™ dataset containing high-resolution charts of lakes. In this case, the dataset covers a very large area and so, absent a scale factor, the corresponding R-value would also be very large. This could result in the Navionics dataset being ranked low even though the data is of high resolution and should be ranked highly. Applying an appropriate scale factor S can correct for this.

Consider the case where the Navionics™ data has a spatial resolution similar to that of a map having a scale of 1:2000 scale. A scale factor S may be chosen so that the R-value for the Navionics product is equivalent to that for a 1:2000 map. Table 1 illustrates the effect that a scale factor S may have on result rankings

TABLE 1

Ranking Results With and Without Scale Factor for Geospatial Data

| Rank | Uncorrected Results Maps and geospatial data are ranked solely on the square root of their surface area. | Spatial Data Correction Geospatial data is adjusted to account for the scale of the data using an S factor. |
|---|---|---|
| FIRST | Record 1 (R = 30) | Record 4* (R = 0.2) |
| SECOND | Record 2 (R = 120) | Record 1 (R = 030) |
| THIRD | Record 3 (R = 949) | Record 2 (R = 120) |
| FOURTH | Record 4* (R = 3162) | Record 3 (R = 949) |

*Fourth record is from a geospatial data source of Canadian Lakes. It covers a large area (about 10 million square km), but has very high resolution. The coordinates given in the search seed search overlap with a detailed map for Shane Lake (only 44 hectares in size). With scale correction, the Navionics ™ product ranking jumps from last to first.

The area represented by a printed map is related to the scale of the map. Also, the scale of a printed map is generally related to the resolution of the map. This is because there are limitations on the level of detail that can be shown in a printed map of any given size. Consider, for example, a map having a scale of 20000:1. On such a map, a distance of 1 mm represents a distance of 20 meters. Given that it is not practical to read features closer together than about 1 mm, the smallest features that can be represented on such a map have a size of about 20 m. For a map having a scale of 250000:1 the smallest features that can be represented on a printed map have a size of about 250 m. Further, where several printed maps are all of the same size, the scales of the maps are proportional to the square roots of the areas represented by the maps.

As another example, a typical printed road map of the entire province of British Columbia, Canada will include highways but not local roads. On the other hand, a street map of the city of Prince George may show both highways and minor streets. Therefore, the scale of a printed map influences the resolution of detail that can be provided. Since printed maps generally have a resolution proportional to their scale, it is typically the case that the larger the area covered, the lower is the resolution. In some embodiments S is set equal to one for some items (e.g. printed maps) while S is set to specific values for other items (e.g. geospatial data sets).

S may be determined for a set of geospatial data, for example, based on distances between point features in the geospatial data set. For example, average distances between nearest features represented in a geospatial data set may be calculated. This may be done through use of standard GIS (Geographical Information System) functions. These average distances may be matched with predefined resolutions and specific scales.

Scaling adjustments may be performed on geospatial datasets to allow the ranking methods to integrate maps and geospatial data by accounting for differences in data resolution. The scaling adjustment may be based on a matrix of distance measurements taken from a matrix (table) of maps with known R-values. The following example is provided in which only one measurement, i.e. a median distance value between aquatic labels, is used to determine scale factor S. However, multiple types of measurements can be included in the matrix in other examples.

In the example shown in Table 2 below, four maps are used to determine scale factor S: a bathymetric map of Shane Lake, a 1:50 K scale map of Prince George (93G15), a regional map of Prince George (93G), and a BC map (NRC). These maps have known R-values, and the median distances between aquatic labels have been calculated. In practice, more maps may be used to improve the reliability of the scaling value.

TABLE 2

Matrix of maps with known R-values and distance measurements

| Map | R-value | Median (km) |
|---|---|---|
| Shane Lake | 0.2 | 0.029 |
| Prince George | 30 | 18 |
| Prince George area | 122 | 72 |
| BC | 949 | 571 |

Regression analysis is performed using median distance as a predictor of R-value. In other examples, other criteria may be considered in the analysis (e.g. median v. average distance, feature types, number of maps used, etc.). The matrix represents multiple combinations of distance values that may be used to calibrate scale factor S. The objective is to develop a matrix of values that provide the best set of results to the user. The matrix of values may vary based on the purpose of the search being carried out.

Figure 18:
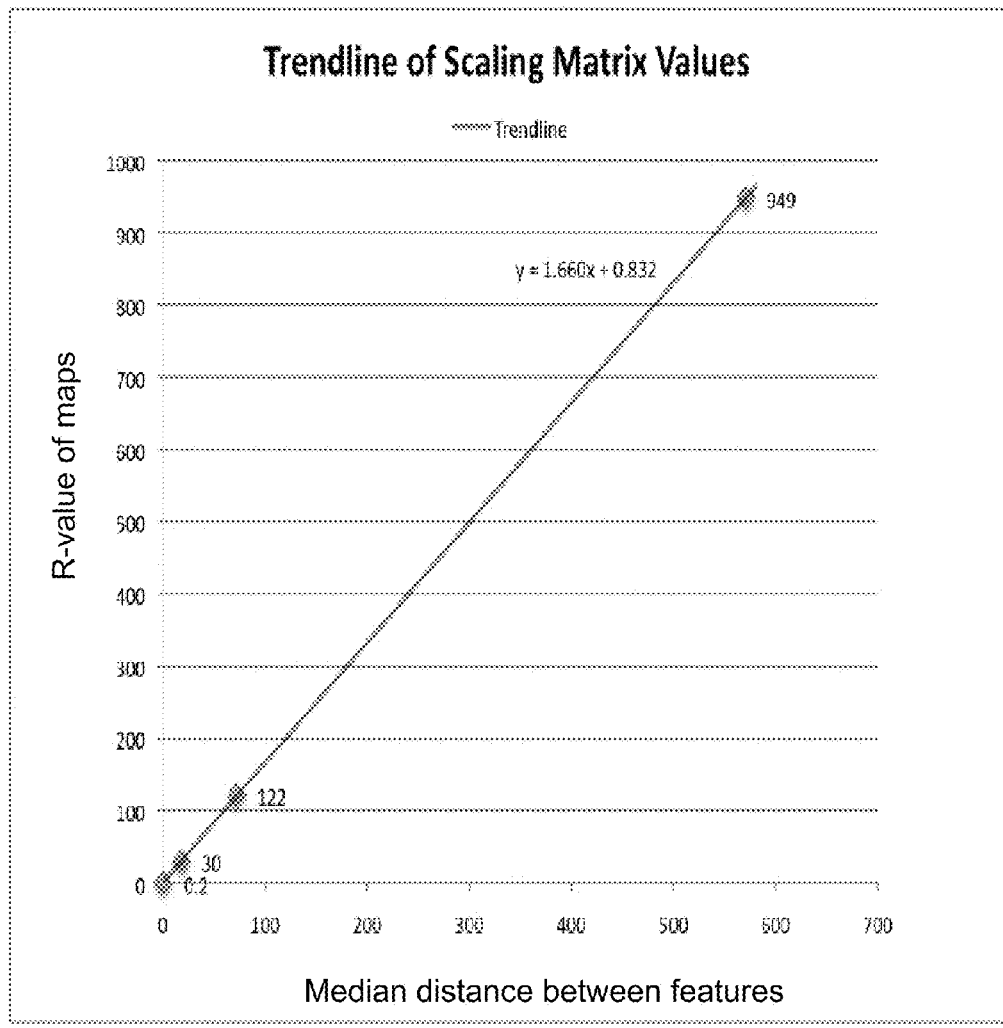
FIG. 18 illustrates the relationship between R-value and median distance between features, for an example matrix of maps having known R-values.

FIG. 18 illustrates the relationship between R-value and median distance for the example shown in Table 2. The equation derived from this example is:

$$Y = 1.660X + 0.832 \quad (3)$$

where Y is the R-value of the maps and X is the median distance between features.

Equation (3) above inherently incorporates the importance of area in determining the Y value. This is accounted for when setting S so as not to double count the area. The calculation to determine S may be, for example:

$$S = Y\sqrt{A} \quad (4)$$

In some embodiments, a query includes scale information. This scale information may be used for ranking the items in a result set. In some embodiments a search seed comprises a value that can be compared to the R-values of items in the result set. In some embodiments, this value is given by $R_{zoom}$. In such embodiments, ranking may be performed by computing differences between the R-values of items in the result set and $R_{zoom}$ and ranking in ascending order of the differences.

$R_{zoom}$ may be based, for example, on one or more of:
the geographic area shown on the display screen of a search interface when a query is presented;
a zoom level in effect when a query is presented;
a level selected by the user;
the size of an area specified by a user using a user interface;
the length of a line or distance between points positioned by a user or selected by the user on a user interface;
the area of a geographical feature selected by a user;
the size of a geographical area currently being displayed on a display screen or window;
a value calculated for a user-selected geographical feature such as a river, lake, highway, or administrative feature such as a park, city, state, or the like using GIS tools (for example, in the case of a linear feature, an envelope can be created around the line and used to represent a surface area of the feature);
and the like.

Some Example Cataloguing Apparatus and Methods

The following describes non-limiting example cataloguing system and methods. In these example embodiments a catalogue containing records corresponding to a number of items is built. The catalogue records are stored in a geospatial database. The geospatial database may comprise a relational database that provides support for geographical objects. In a prototype embodiment the geospatial database comprises a combination of PostgreSQL™, PostGIS™ and MySQL™ spatial objects.

A perimeter binding method is applied to associate a geographical area to each item to be catalogued. The cataloguing system determines a perimeter (boundary) of each item (e.g. each map or geospatial object) to be included in the catalogue. Perimeters may be associated with printed maps as well as geospatial data sets. Once the perimeter for an item has been determined, an R-value for the item may be computed. In some embodiments, item perimeters are represented in an electronic/computer-accessible format suitable for processing by a GIS system and the R-value is determined by applying a GIS system function to determine an area within the perimeter and computing the R-value according to Equation (1).

In the prototype embodiment, the perimeter of each item is stored in the geospatial database as an individual polygon. Each polygon may be located in real space (e.g. according to longitude and latitude coordinates). The surface area, centroid, and R-value for each polygon is calculated and stored in a database record corresponding to the item.

Associated attribute data for each item, if any, is also included in the database record. The associated attribute data may include, for example, title, author, publisher, keywords, description, and/or ISBN number. According to particular embodiments, a primary record for the map or geospatial object includes the following attribute fields: Unique identification (ID), spatial object, area, R-value, centroid (two fields), scale factor S, data type (map, record, file, etc.).

Other tables may be used to link each record in the primary table to additional information. This may be useful as maps and spatial data often have unique sets of attributes that may not be equally represented across all records of the catalogue. For example, the following additional attribute fields may be defined: product category/type, publisher, title, file date, author, keywords, description, price, thumbnail, comments, secondary reference ID, version number, and the like.

Resolution information is also obtained for each item. For items of some types (e.g. printed maps) the resolution may be inferred from the perimeter (e.g. a resolution value may be automatically calculated from the perimeter). In general, the smaller the perimeter, the higher the resolution. For items of other types, the expected resolution may be determined from the item itself or from metadata associated with the item.

Any suitable method may be applied to determine a perimeter of geospatial data. For example a convex hull may be used. As another example, a bounding box or envelope may be used. The bounding box defines a maximum and minimum set of latitude and longitude coordinates.

In the prototype embodiment, R-values for maps are determined by computing the square root of the area covered by the map as in Equation (1) above (or as in Equation (2) above with S=1). For geospatial data sets the R-values are determined by Equation (2) above with S based on an estimation of a spatial resolution of the geospatial data set. Spatial resolution may be estimated by determining distances between point features to estimate the maximum resolution of the data. The smaller the average distance between features the higher is the average spatial resolution. Based on these distances, a matrix is used to match the median feature distance with predefined resolutions and specific scales (e.g. an example matrix for determining scale factor S is shown in Table 2 above). This provides an estimated resolution of the geospatial data. A value for S that corresponds to the estimated resolution is then assigned.

In instances where a scale or resolution of the geospatial data set is known (for example where the source data for the geospatial dataset is known) the scale factor S may be based upon the known scale or resolution.

In some embodiments, apparatus is provided to automatically incorporate submitted items into a catalog. The apparatus may comprise:
 an interface to receive information regarding new items to be included in the catalog;
 a module configured to establish perimeters for the new items;
 a module configured to compute R-values for the new items based at least in part on the perimeters; and
 a module configured to store in a database catalogue records corresponding to the new items, the catalogue records including the perimeters and the R-values.

The modules may be implemented by suitable logic circuits; one or more suitably programmed data processors; or the like.

The following are some specific example methods for adding catalogue records corresponding to items. The example methods include:
 User supplied perimeters;
 Selecting pre-set administrative boundaries;
 Matching existing catalogue records;
 Bulk binding methods;
 Geospatial dataset binding methods;
 Calculating a scale correction factor for geospatial data; and
 Geo-aggregation methods.

FIG. 1 illustrates an automated method 10 for adding an item to a catalogue of items. Method 10 may be performed, for example, by a programmed computer which is configured to execute a set of software instructions for each step of method 10. Method 10 is initiated when an item is being processed for inclusion in the catalogue. For example, a user may have initiated a request to add the item to the catalogue by, for example, actuating a control using a user interface. In block 12 the user is prompted to select a method for inputting a perimeter corresponding to the item being processed. In block 13 the system interacts with the user to receive information to define a perimeter for the item. In block 14 the system accepts from the user further information regarding the item. The further information may comprise additional parameters such as title, author, publisher, keywords, description, ISBN number and/or other reference information supplied by the user.

In block 15 the system establishes a perimeter for the item. The perimeter may comprise a polygon. In block 16 the system calculates values based on the perimeter. The values may comprise, for example the area and centroid of the polygon. The centroid may be used to measure distances between items or geospatial objects. Such information may be useful for determining scale factor S when multiple records are linked together to create a new geospatial object. The centroid may also be useful when identifying a record as a point. In block 17 the system computes an R-value and optionally a scaling factor, S, for the item. In block 18 the system stores a record representing the item. The record includes a polygon representing the perimeter, an R-value and other information associated with the item.

Figure 2:
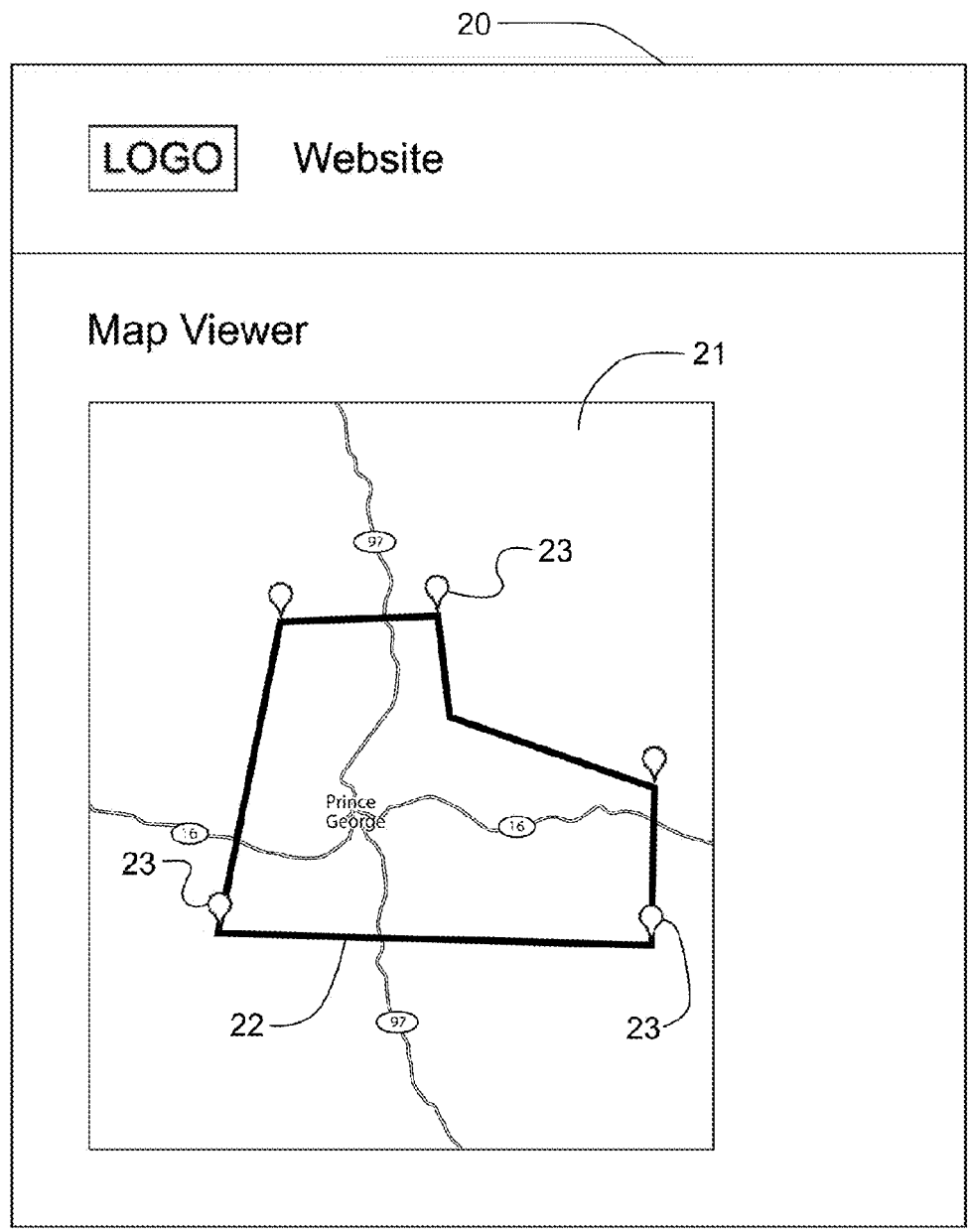
FIG. 2 illustrates binding a perimeter to an item.

In some embodiments users can generate their own perimeters for items. This may be done, for example, by using a web-based or other GUI-based map interface, such as Google Maps™, to create a boundary. FIG. 2 shows an example of this. In FIG. 2, a web page 20 displays a map 21. A user has created a perimeter 22 on the map by placing markers 23 using tools of the map interface.

In the specific example illustrated in FIG. 2, the user is generating a perimeter in a system designed to assist vendors in adding maps or geospatial data sets to a catalogue system. The user can click points on the screen to build a perimeter for each item. Markers 23 (shown as balloons) are added by clicking on the screen. The positions of markers 23 can be altered to adjust the perimeter. Markers 23 may be added or removed. When the perimeter meets the user's needs, it is submitted, along with other attribute data to be checked and inserted into the catalogue.

A user may make inputs as illustrated in FIG. 2 using a suitable web-enabled device having a suitable interface that the user can operate to enter geospatial points. The user can zoom into the area of interest and build the perimeter of a map by clicking using a pointing device such as a mouse to generate markers 23 to indicate points on the boundary.

Suitable scripts on the user's web-enabled device (for example, php, xml and/or Javascript™ scripts) may be provided to lead a user to input the spatial data and to pass the spatial data to a cataloguing system for analysis and storage.

Many maps and geospatial data sets are specific to areas that have predetermined administrative boundaries. For example, maps of specific towns, cities, counties, provinces, states, countries, parks or the like may have perimeters that coincide with an administrative boundary of the area to which the map or other item relates. To simplify entering perimeters of items of this type, a system may comprise a set of predefined perimeters (e.g. polygons) corresponding to administrative boundaries. A user interface may permit a user to select a desired predefined perimeter by, for example, selecting from a list, clicking on a representation of the boundary on a map, entering text (e.g. a name of the area), or the like. This makes it much faster to select the perimeter.

Figure 3:
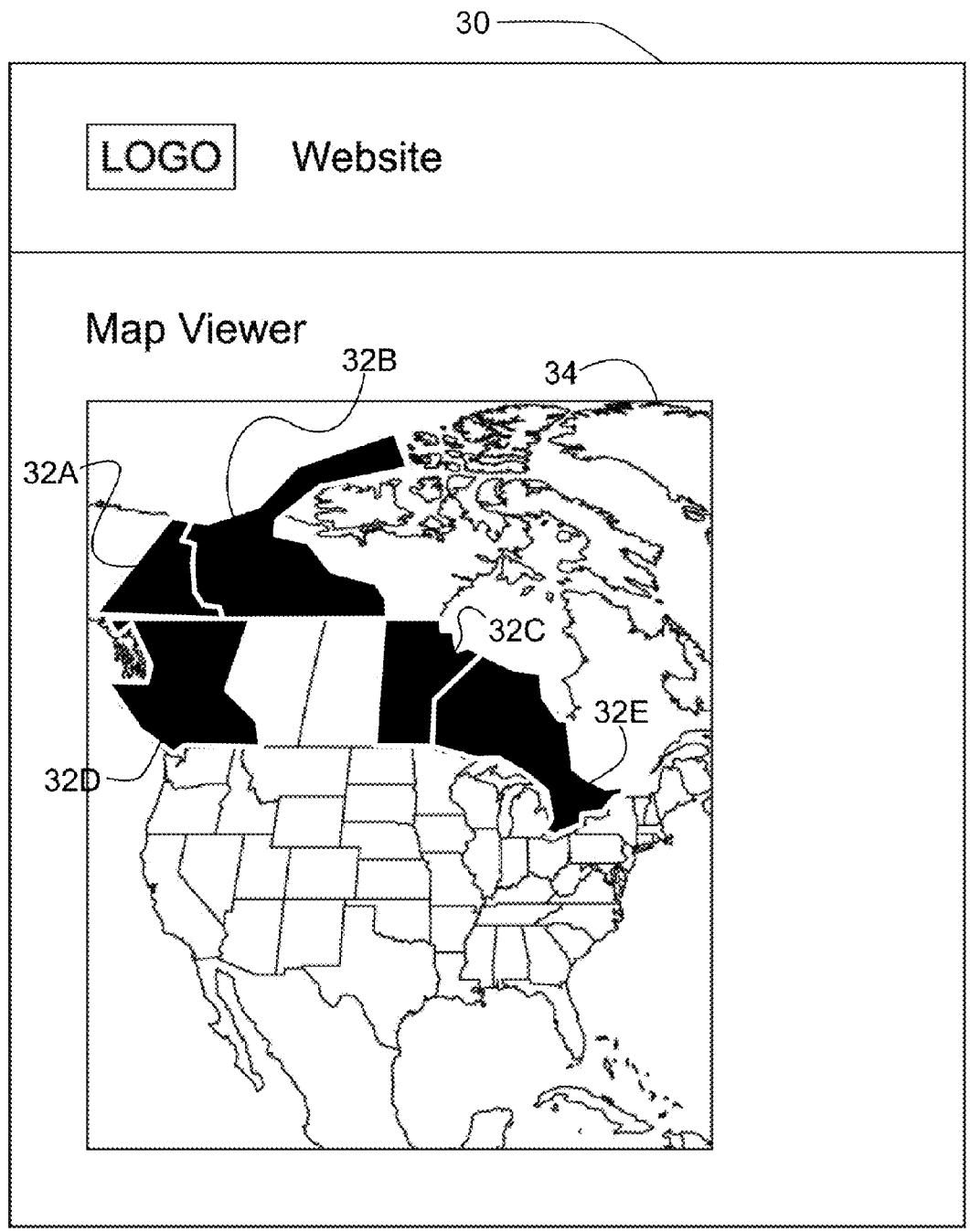
FIG. 3 illustrates selecting pre-set administrative boundaries.

FIG. 3 shows a display 30 presented by an example user interface in which boundaries 32A, 32B, 32C etc. for a number of administrative regions are displayed on a map 34 for a user to select from. Vendors of maps or geospatial data sets for such administrative regions can select the polygons that represent the perimeters for their products. The selected polygons (or references to the selected polygons) may then be saved in the catalogue database. The surface area, centroid and R-values for the polygons may have been determined in advance or may be calculated and stored.

In some cases, items such as maps or geospatial data sets have perimeters that are based somehow on the perimeters of other maps or geospatial data sets that have been previously catalogued. For example, the perimeter of a new item may be:
  the same as a perimeter of some already-catalogued item;
  the same as some cluster of the perimeters associated with previously-catalogued items;
  a perimeter that encompasses the perimeters associated with certain previously-catalogued items;
  etc.
In such cases a cataloguing system may permit a user to select an existing perimeter or the perimeter of a cluster of existing perimeters to represent a new item such as a map or geospatial data set.

Figure 4:
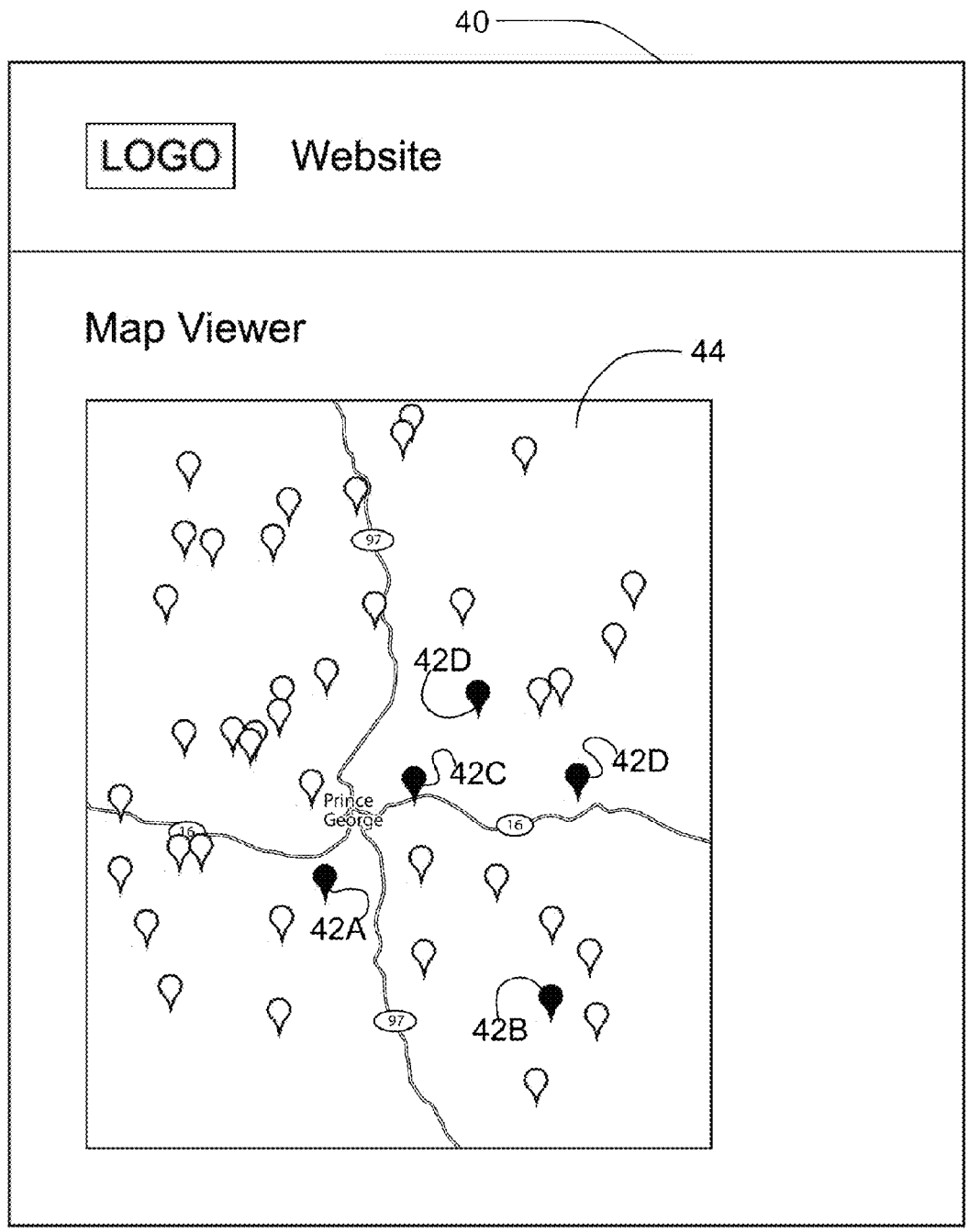
FIG. 4 illustrates selecting pre-existing records to create a new record.

FIG. 4 illustrates an example display 40 from a user interface which displays indicia 42A, 42B, 42C, 42D etc. (collectively indicia 42) corresponding to a number of existing polygons on a map 44. In this example, lakes corresponding to items that are already included in the catalogue are indicated by balloons. A user can select balloons 42, for example by clicking on them. If the user wishes to add a new map to the catalogue that covers an area that includes several of the lakes then the user can select the balloons or other indicia 42 corresponding to the lakes to be included. Once the user has selected balloons corresponding to all the lakes of interest, a new perimeter that wraps around all of the selected lakes is automatically created.

The new perimeter may be created, for example, by applying a convex hull function or other perimeter estimation method such as a bounding box defining a maximum and minimum set of latitude and longitude coordinates. Other methods of determining the perimeter may use a GIS "multi-polygons" function, which ties multiple isolated spatial items into a single record while preserving the spatial characteristics of each item. Such multi-polygons function is different from a convex hull function because spaces can exist between multi-polygons. Such approach may enable more complex scaling to be applied as distance measurements within each item may be used to calculate scale factor S. For example, for Navionics data for Canadian lakes, the scale associated with each lake may be used to determine the scale factor S, rather than using the centroid of each lake (wherein the distance between the lakes would determine the scale and apply a higher scaling value).

A scale factor S may be determined by averaging the R-values for the items within the perimeter. The median or average of the R-values which already exist for the items may be used to determine a new R-value, applying similar principles used to determine scaling values based on average or median distances between features (e.g. as described above with reference to Table 2).

In some cases a collection of data representing a number (which may be a large number) of items to be added to the catalogue may be available. For example, it may be desirable to create records corresponding to each of the maps of a large set of topographical maps into the catalogue. The data may comprise information identifying a perimeter associated with each item. Such data may be bulk imported by the cataloguing system by way of a suitable interface which assigns the data to appropriate fields in the catalogue database.

Some items that it may be desirable to add to a catalogue do not have a well defined perimeter. An example is a geospatial data set for which certain information is provided for a number of points. Coordinates for each point may be specified in the geospatial data set but the geospatial data set may not be explicitly associated with any specific perimeter. In such cases a perimeter may be generated and the perimeter may be associated with the item in the catalogue database.

Figure 5:
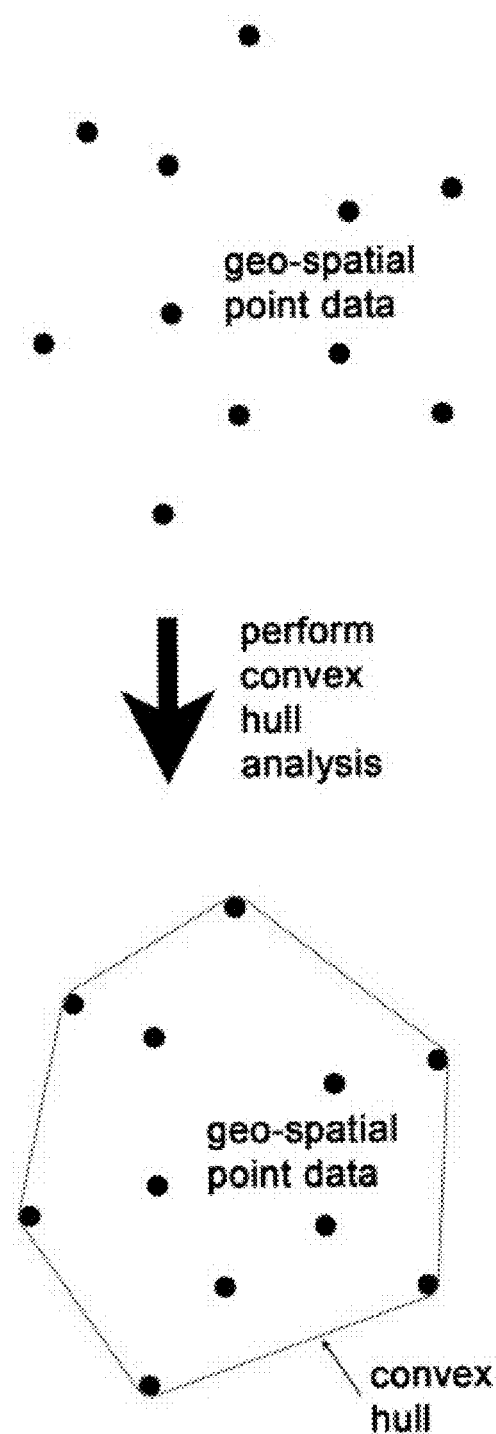
FIG. 5 illustrates a perimeter binding method applicable to unbounded geospatial data.

There are a variety of GIS functions that may be applied to creating a perimeter for an initially unbounded set of locations. One approach is illustrated in FIG. 5. This approach generates polygon that encompasses all of the unconsolidated locations. A convex hull function may be applied to create such a perimeter. This approach may be applied to datasets which include line and polygon features as well as points by determining centroids of the features and using the centroids to determine distances between the features.

Figure 6:
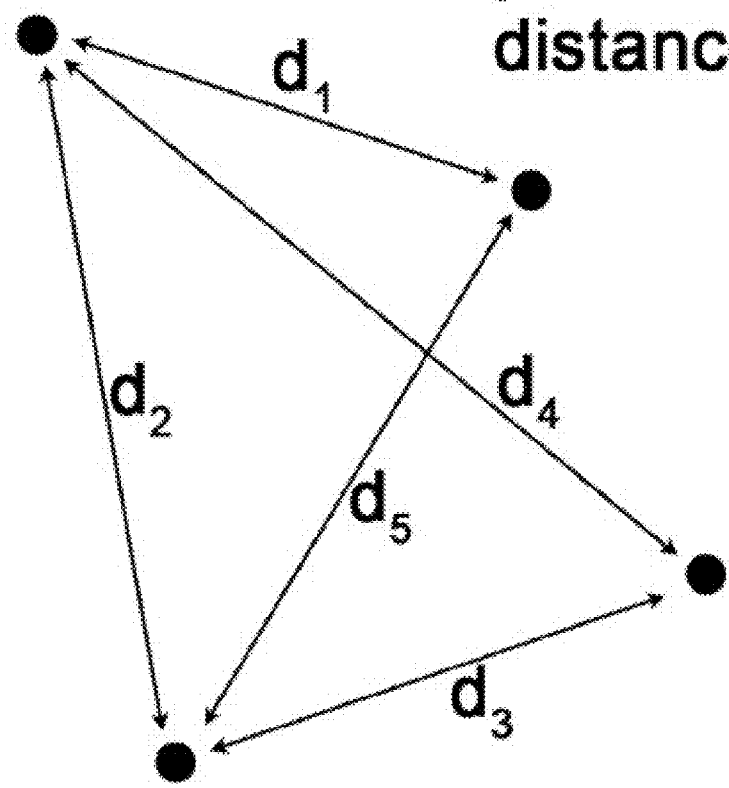
FIG. 6 illustrates a method for calculating a ranking correction for geospatial data.

Creating a perimeter for a geospatial data set does not automatically provide an indication of the spatial resolution of the geospatial data set. An approximate resolution of a geospatial data set may be determined by analysing the locations of all features in the data set (see FIG. 6) and determining the average distances between the features. The larger the average distances between features, the coarser is the spatial resolution of the geospatial data set. The average distance may be used to look up in a lookup table a corresponding equivalent map scale and a corresponding factor S for the geospatial data set. Data having a high resolution (small distances between features) will have a lower S value which will allow an appropriate R-value to be determined using Equation (2), for example.

In some cases, it may be desirable to add to a catalogue items such as geospatial data sets that are available on the Internet or an intranet or the like. In some embodiments, such items are automatically located and added to a catalogue database. In some embodiments, a cataloguing system incorporates a web crawler. In some embodiments the cataloguing generates a perimeter and/or an R-value for each item that it detects and creates a record in a catalogue database for the item. The record includes one or both of the perimeter and the R-value.

For example, a cataloguing system may implement a web crawler or access a search engine to locate geospatial data by identifying accessible files that have names which indicate geospatial data (e.g. names including extensions such as .shp, .kml, .gpx, and other common formats). Once a file containing geospatial data is located, the file is downloaded to the cataloguing system and the data is analysed. The cataloguing system generates a perimeter (for example as described above). The cataloguing system generates an R-value for the data set (for example as described above).

In some embodiments, the cataloguing system automatically retrieves information relating to the data set. For example, a series of filters may be applied to the content of a web page from which a file containing a geospatial data set is retrieved. The filters may select relevant geospatial terms and save those terms as keywords. Other information about the data may also be extracted and used to populate fields such as title, keywords, description, etc.

Some Example Searching Apparatus and Methods

The following describes non-limiting example searching systems and methods. These methods and apparatus are machine-implemented and may identify items of interest from a catalogue database in which items are associated with geospatial areas. A typical search comprises:
  Receiving a query that includes a seed that identifies a location or set of locations;

Comparing the location or set of locations identified by the seed with geospatial areas associated with items in the catalogue to obtain a result set.

Apply ranking methods to order items within the result set.

Returning results to a user.

Figure 7:
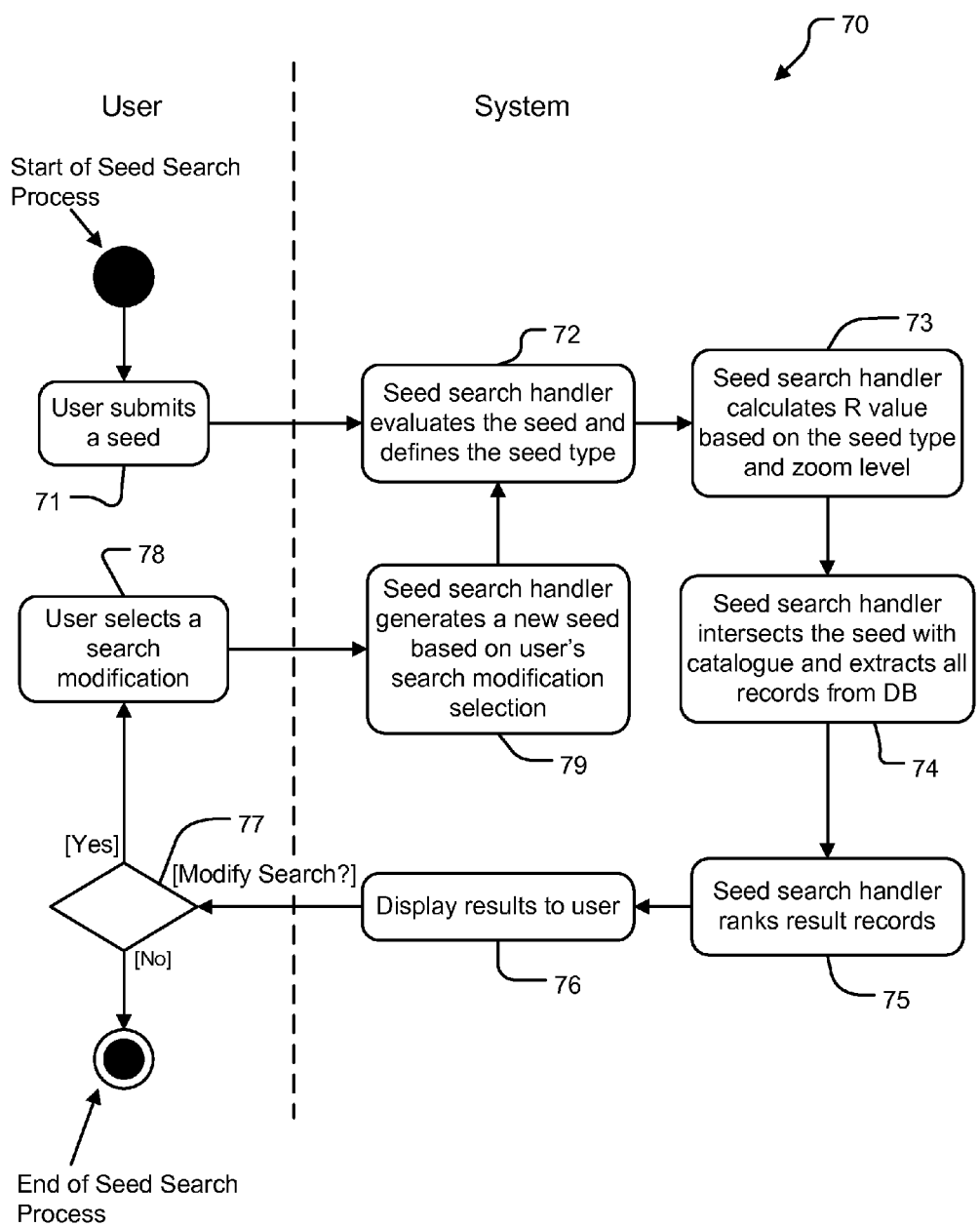
FIG. 7 is a flowchart illustrating an example method for performing a search to locate maps or other items of interest relating to a location.

FIG. 7 illustrates an example search method 70. Method 70 receives a search seed from a user at block 71. The search seed identifies at least one location. The location may be specified, for example, as:

a latitude and longitude,
a grid reference,
a zip code or postal code,
another geocode,
etc.

In some embodiments the search seed also comprises scale information (which may be zoom information in some embodiments).

In block 72 the search seed is evaluated and the type of seed is determined. Block 72 may determine, for example, whether the search seed identifies a single location (point) or a set of locations (e.g. a line or area). In block 73 if the seed includes a zoom level or other scale information, an R-value ($R_{zoom}$) is computed for the seed. In some embodiments, block 73 assigns a default R-value (for example a very small number or zero) to $R_{zoom}$ if the search seed does not include another R-value or information from which an R-value can be determined.

In block 74 the seed identifies relevant records from the catalogue by, at least in part, intersecting the location specified by the search seed with the locations associated with items in the catalogue database. Block 74 may apply an INTERSECT function provided by a GIS (Geographic Information System) software package, for example. This localizes the search to specific geographical areas of interest, eliminating records that are associated with perimeters that are geographically remote from the search location. The result set of records that correspond to geographical areas that overlap with the location(s) specified by the seed are extracted from the catalogue database along with attribute data, including the R-values for the records in the result set.

Block 75 ranks the records in the result set. Block 75 may compare an $R_{zoom}$ value generated from the search seed (from block 73) to R-values for items in the result set. In some embodiment, the comparison comprises computing a difference between an $R_{zoom}$ value from the search seed and R-values for the items in the result set. In some embodiments, the absolute value of the difference is computed.

In block 76 the result set is returned to the user. Block 76 may comprise sorting the result set. For example, the result set may be sorted in ascending order of the differences between the $R_{zoom}$ value from the search seed and R-values for the items in the result set, starting with the record having the smallest absolute difference. The result set may be presented to the user in this order. This results in the items of the result set being ordered in increasing order of their R-values.

Where the $R_{zoom}$ value from the search seed has a value that is very small or zero then higher-resolution items are listed first followed by lower-resolution items. For example, a map of Galveston Tex. will be ranked higher than a map of all of Texas when a search seed intersects with the locations corresponding to both maps. Where the $R_{zoom}$ value from the search seed has a value that is not very small, items having resolutions (as indicated by R-values) that are close to $R_{zoom}$ are listed first followed by lower- and higher-resolution items. For example, consider a case where a search seed specifies a location corresponding to the town of Cedar Rapids Iowa and where $R_{zoom}$ corresponds to the area of the state of Iowa. In this example, maps of the state of Iowa in the result set will be ranked more highly than maps of the town of Cedar Rapids and will also be ranked more highly than maps of the entire United States.

Block 77 receives user input indicating whether or not the user wishes to modify the search. If so, (YES result in block 77) method 70 proceeds to block 78 wherein a modified query is received. Otherwise (NO result in block 77) method 70 ends. In block 79 a new search seed based on the modified query from block 78 is prepared. The new search seed is provided to block 72.

The following sections provide specific examples of searches. Some embodiments comprise or implement optional search features. Examples of such features are:

Zoom enriched search
Linear enriched search
Polygon enriched search
Stepwise seed expansion
Text-based seed enhancements.

Specific Example

Basic Search

Figure 8:
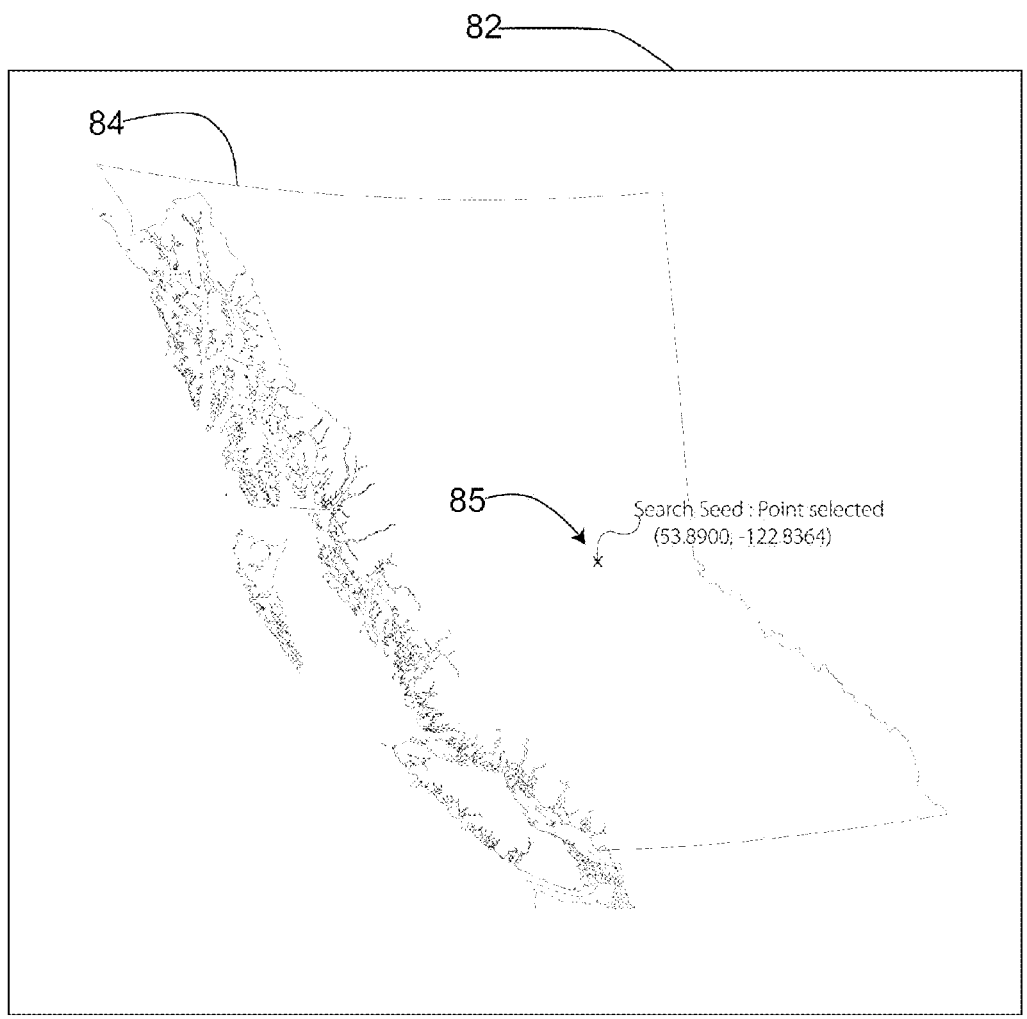
FIG. 8 illustrates selecting a base search seed.

In this example, a search seed is submitted as a simple geographic point. The point may be generated in any of a variety of ways as described above. In FIG. 8, the search seed is a point located in Prince George, British Columbia, Canada and represents the centroid for Shane Lake, in Forests For The World. The latitude is 53.8900 and the longitude is −122.8364. There is no zoom level attached to this submission. If the search system is configured to use a zoom level then a zoom level of zero may be assumed ($R_{zoom}=0$).

Figure 9:
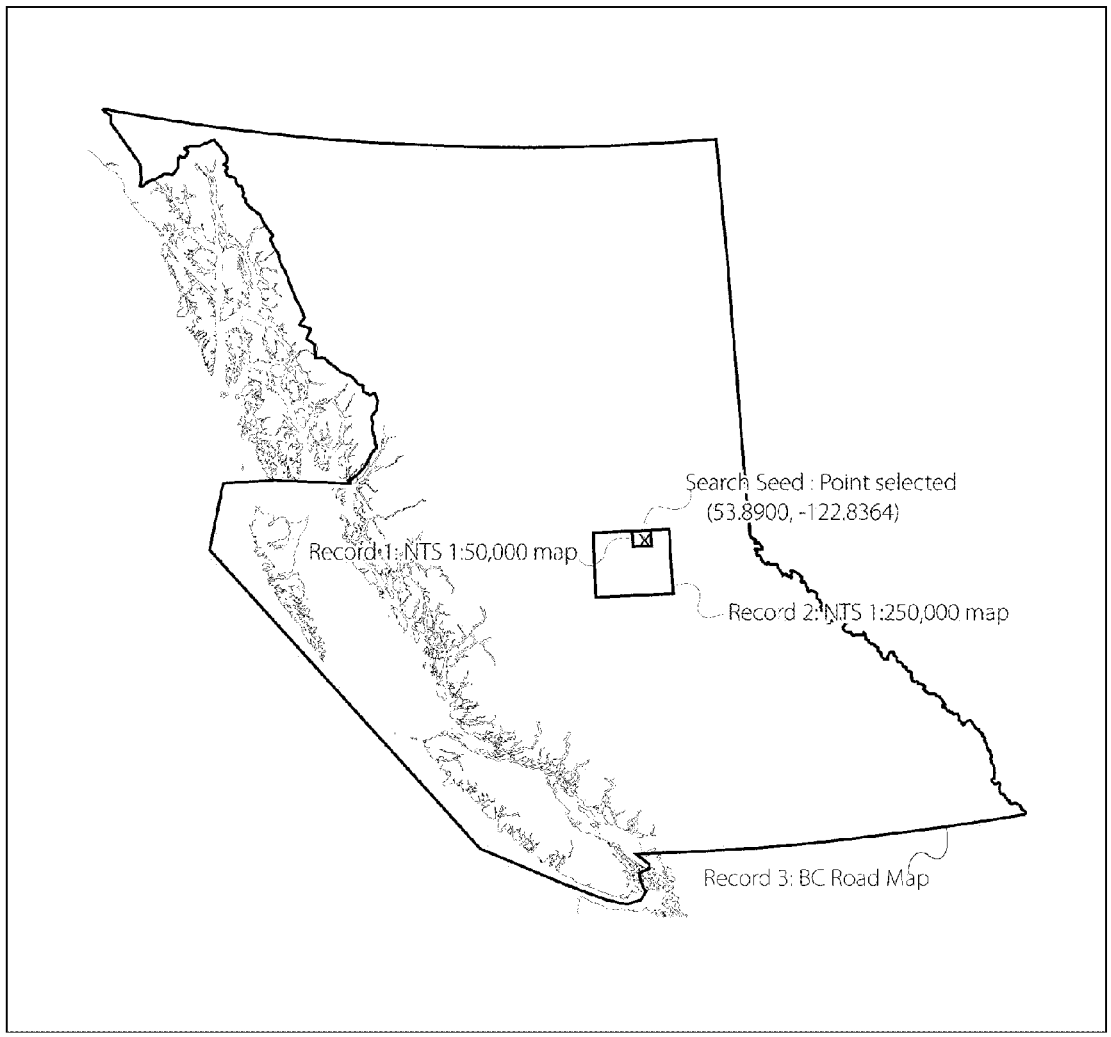
FIG. 9 illustrates a base perimeter selection process.

Upon execution of the search, all records that have areas that overlap the search seed are returned in a result set. Records in the result set contain spatial and aspatial information. The spatial information comprises surface area, centroid position, R-value. The aspatial elements may comprise title, keywords, author, publisher, ISBN number, etc. In this example, the result set is assumed to include only three records (see FIG. 9). The number of records in the result set may be very much greater.

The results in the result set are ranked based on their R-value. The record having the smallest R-value is ranked first, records having greater R-values are ranked later (see FIG. 10). This means high resolution results appear first, whereas the maps that cover the largest areas are at the end of the result set. Maps or other items that are associated with large areas will be included in the result sets for many searches but are the least likely to be of interest and therefore should generally appear at the end of the results. Sample results are listed in Table 3.

TABLE 3

Base Search Results.

| Rank | Base Search | Area | $R_{map}$ |
|---|---|---|---|
| First | Record 1: 93G15 (50k) | Approx. 900 km² | 30 |
| Second | Record 2: 93G (250k) | Approx. 15,000 km² | 122 |
| Third | Record 3: BC Map (~1:2 million) | Approx. 900,000 km² | 949 |

The results are displayed to the user in a manner that indicates the ranking of the search results. For example, the ranked search results may be delivered to the user as a list, with maps and geospatial data highlighted through a user display. The exact format is dependant on the platform.

Figure 10:
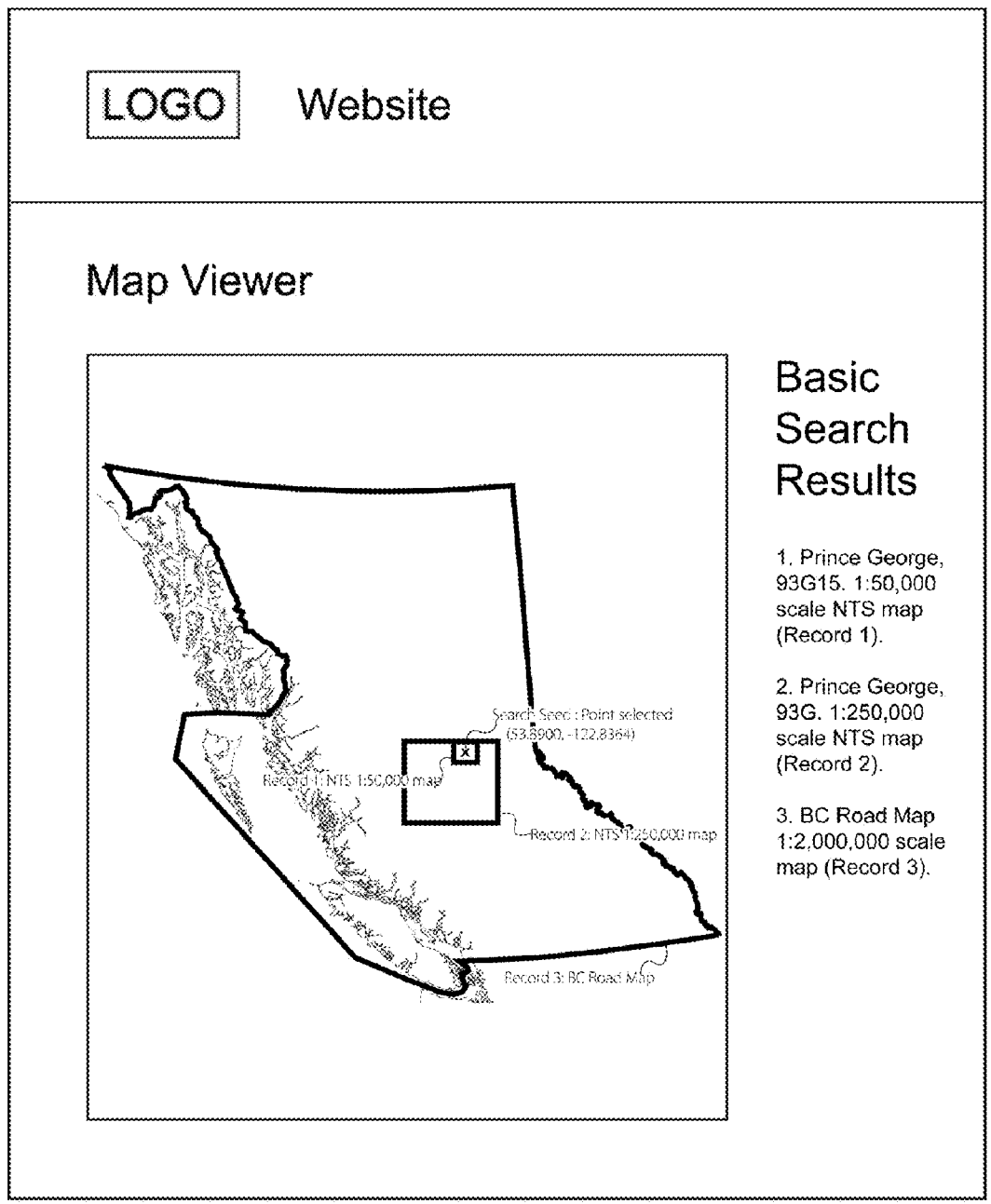
FIG. 10 illustrates a base result ranking and display.

FIG. 10 is an example of how search results may be presented. The graphical display shows the perimeters of each record selected, with the most relevant result being overlaid on top of the other records, and the least relevant result being displayed on the bottom. The perimeters shown are shaded based on their ranking The highest ranked record is shaded the darkest. The list includes the title of the record, along with some additional attribute data. Each records is hyperlinked to additional information about the record, either through an interactive map tool, a list or a combination of both. In the embodiment illustrated in FIG. 10, Google Maps™ is used as a platform for displaying the perimeters of the records in the result set. A user can click on a record (either in the list or the perimeter view) to retrieve further information on an item, link to a digital file corresponding to the item and/or purchase the item.

If the results are not to a user's expectations, the user may choose to refine the search using text based methods (e.g. keywords); expand the area covered by the search using, for example, a stepwise expansion as described below; or start a new search. By adding text filters a user can cause the number of results returned in the result set to be reduced.

Specific Example

Zoom-Enhanced Search

Where search seeds include zoom or other resolution information, the zoom level may be used in ranking the records in a result set. Zoom information may be used in the search itself (e.g. using a polygon of the zoomed area).

Figure 11:
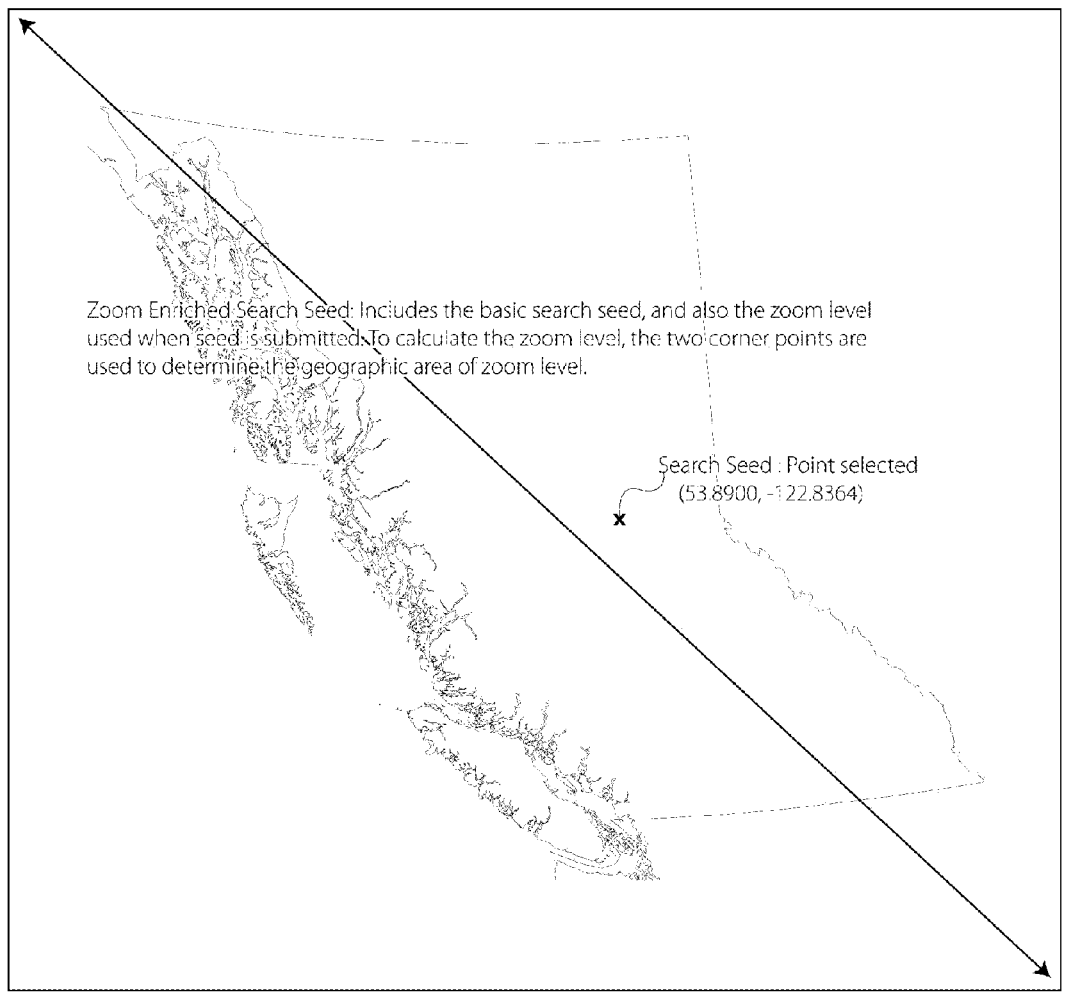
FIG. 11 illustrates establishing a search seed based on a zoom level.

FIG. 11 illustrates an example search in which a zoom level is obtained and used in ranking search results. In the illustrated example embodiment, the spatial extent of the geographical area being shown on a view screen is captured with the base search seed. An $R_{zoom}$ value is calculated based on the geographic area represented in the view screen.

Figure 12:
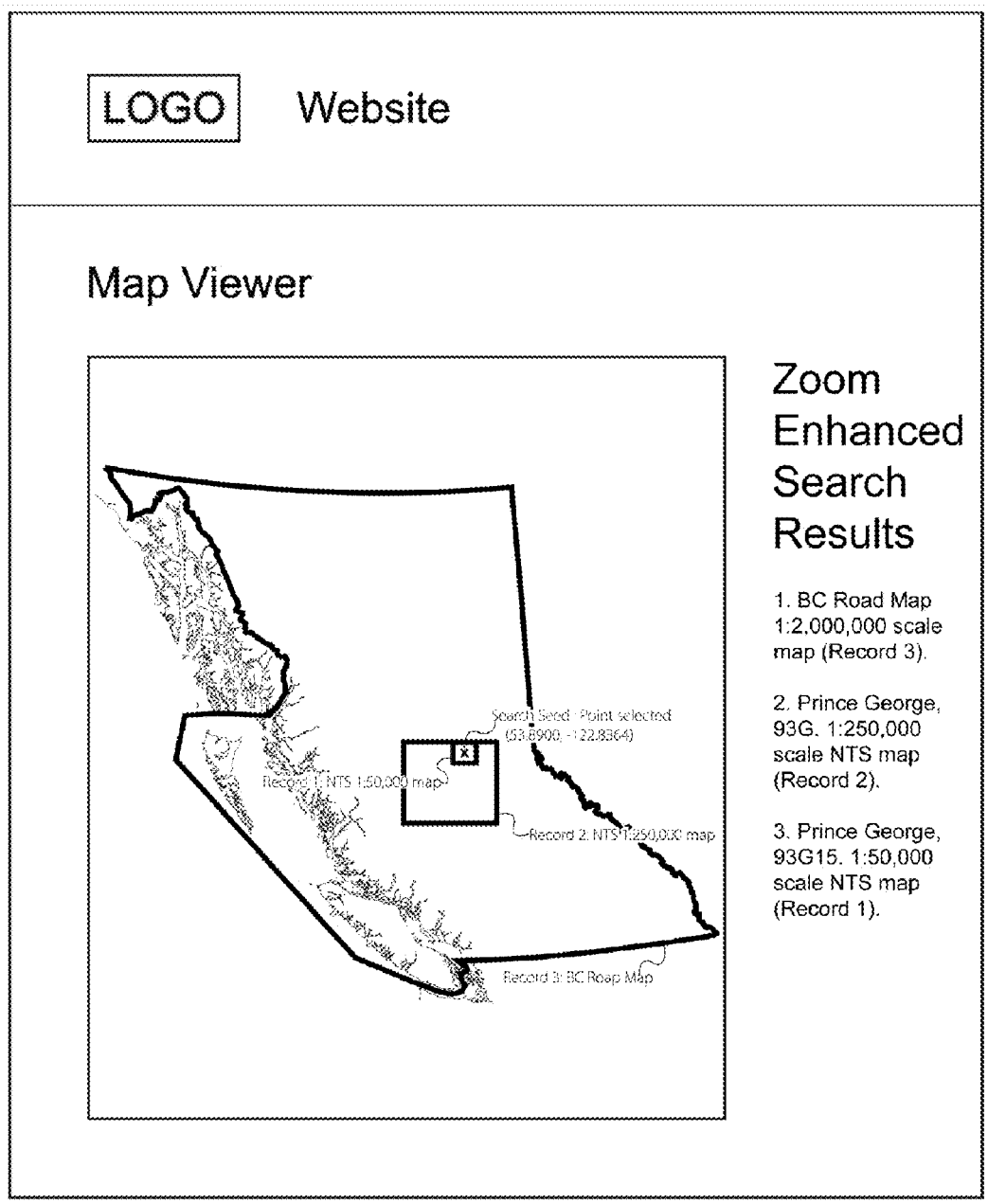
FIG. 12 illustrates result ranking and display responsive to a zoom level.

Searching may be performed in the same manner as the basic search described above. The R-values for the records in the result sets are compared to the $R_{zoom}$ benchmark value. The records in the result set are ranked based at least in part on the differences between the R-values and the benchmark value. This means that the highest ranking item in the result set will have an R-value that is nearest to the $R_{zoom}$ benchmark value. The larger the difference, the lower ranking to where the lowest ranked has the greatest difference in scale. On a display screen, higher ranked records may be shown in darker shades, and placed in front on lower ranking records. All records may be hyperlinked for further information. FIG. 12 illustrates how the results from a zoom-enriched search may be presented. It can be seen that the zoom enriched search ranks the results differently from the base search. In this example, the $R_{zoom}$ value is large and therefore the BC map is ranked first and the smallest area map is ranked last. Table 4 provides several examples of result rankings based on different zoom levels.

TABLE 4

|  | Rank | | |
| --- | --- | --- | --- |
|  | First | Second | Third |
| Zoom Level 1,000 km² $R_{zoom}$ = 31 | Record 1 (R = 30) | Record 2 (R = 122) | Record 3 (R = 949) |
| Zoom Level 10,000 km² $R_{zoom}$ = 100 | Record 2 (R = 122) | Record 1 (R = 30) | Record 3 (R = 949) |
| Zoom Level 250,000 km² $R_{zoom}$ = 500 | Record 2 (R = 122) | Record 3 (R = 949) | Record 1 (R = 30) |
| Zoom Level 1,000,000 km² $R_{zoom}$ = 1,000 | Record 3 (R = 949) | Record 2 (R = 122) | Record 1 (R = 30) |

Specific Example

Linear Search Seed

Figure 13:
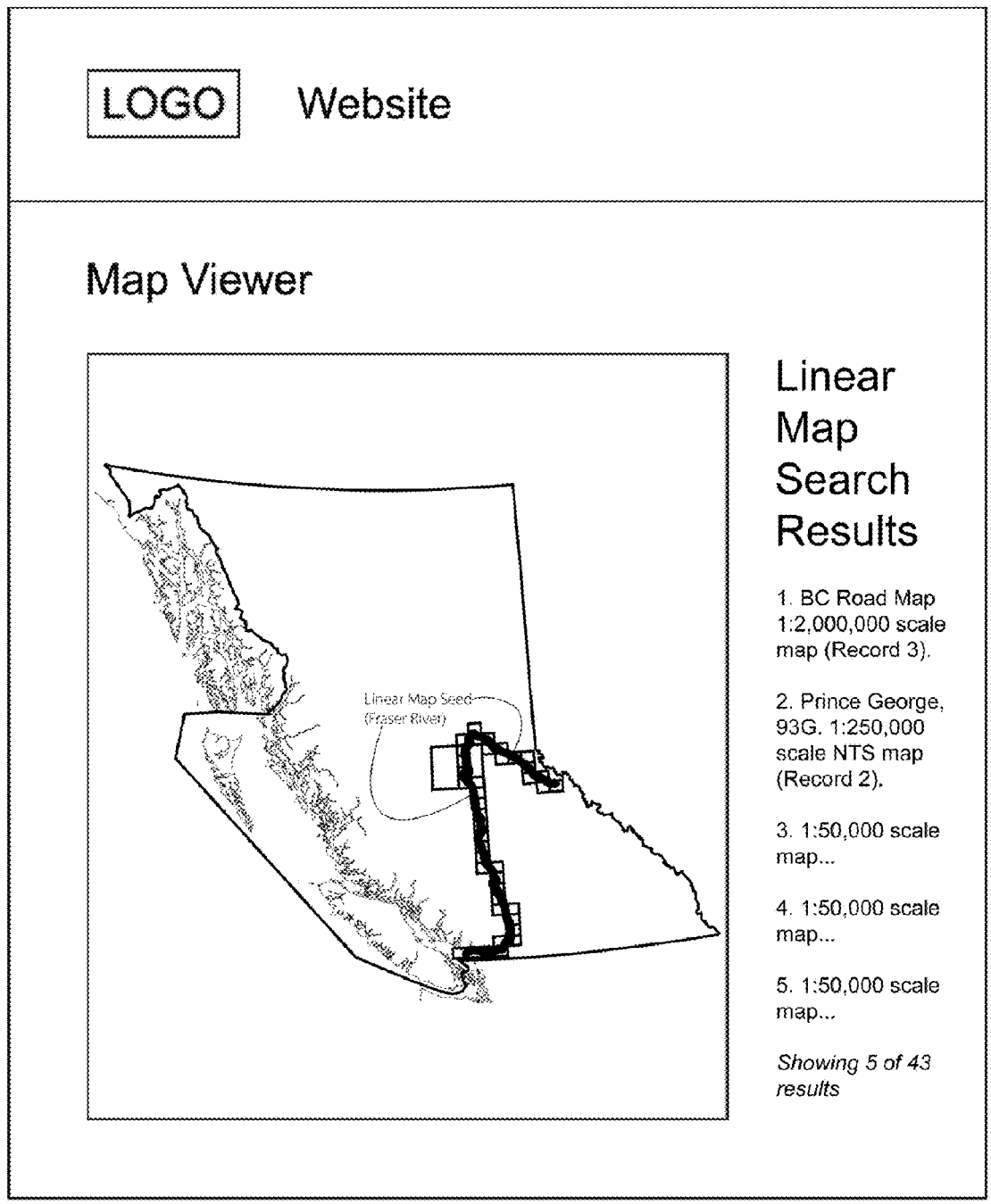
FIG. 13 illustrates a linear enriched result ranking and display.

Search seeds are not limited to points. In this example, the seed is replaced with a line (e.g. a polyline) representing the Fraser River (see FIG. 13). To help illustrate how the method affects the results, the search is performed against a catalogue which includes the entire NTS catalogue of 1:50,000 topographical maps as well as other maps.

In this example, the search begins by conducting an intersect of a line representing the Fraser River with all overlapping records. Once retrieved, a zoom level for the line is set as the benchmark to which all records are compared. The zoom level is determined by using GIS to set a bounding envelope around the line. A value for $R_{zoom}$ may be determined based on the area of the polyline envelope (using Equation (1) for example). A bounding box is created around the polyline which represents the minimum and maximum coordinates (latitude and longitude) for the line. The bounding box is used to determine the zoom level. The records with an R-value closest to the $R_{zoom}$ value will be ranked highest.

The example shown ranks a BC Road map first because that map covers an area that most closely matches the $R_{zoom}$ value. The 1:250,000 map is ranked next. Finally the 1:50,000 maps, as they have the biggest difference in R-values. Records with the same R-value are sorted alphabetically. In other examples, records with the same R-value may be sorted by some other criteria, such as by file date.

Specific Example

Polygon Search Seed

Figure 14:
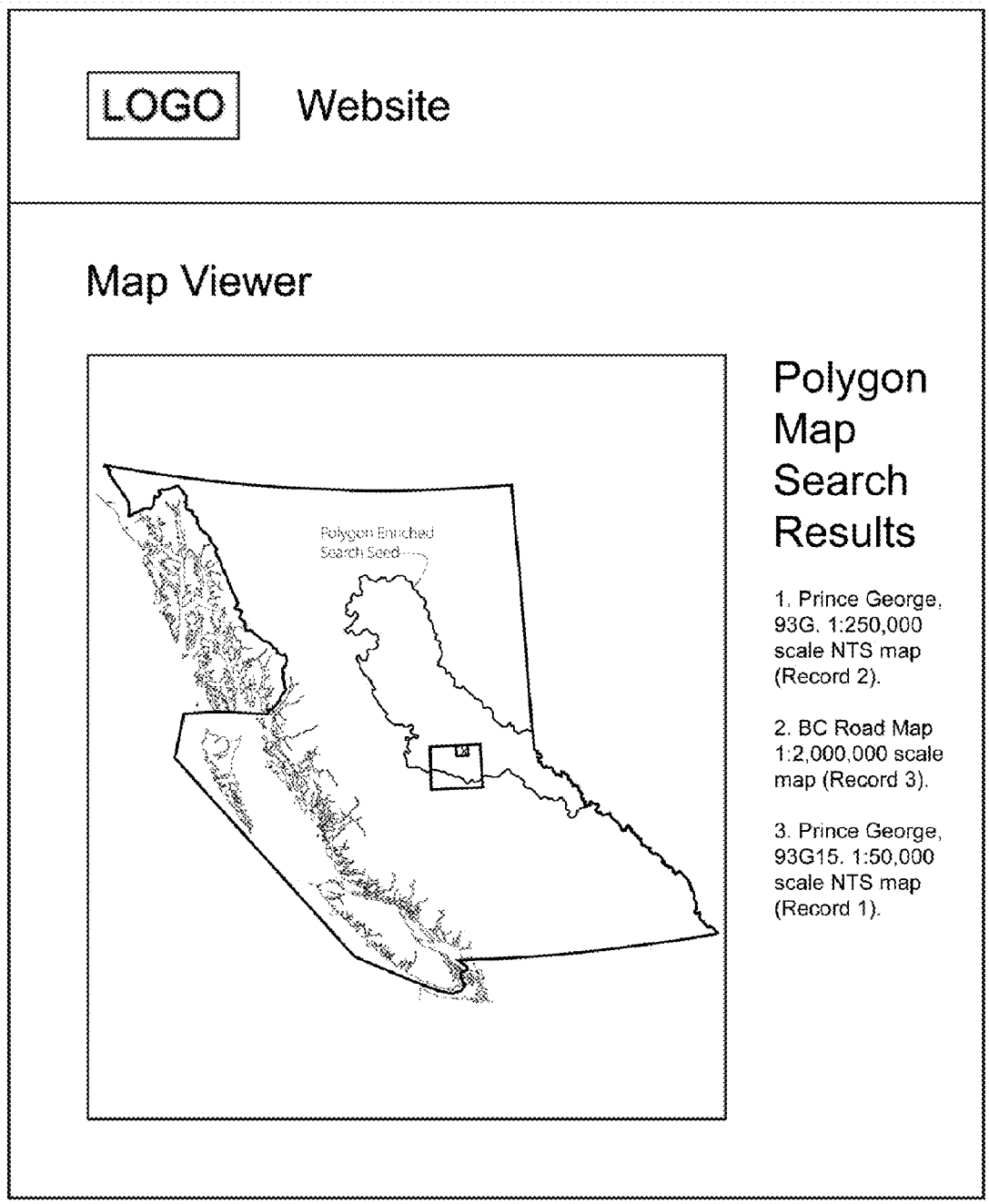
FIG. 14 illustrates polygon enriched result ranking and display.

FIG. 14 illustrates the use of a polygon search seed. In this example, the search seed is a polygon roughly equal to the Omineca Management Region of the British Columbia Ministry of Environment. A value for $R_{zoom}$ may be computed from the polygon (using Equation (1) for example).

Specific Example

Stepwise Seed Expansion

In some embodiments, the results from an initial search are applied in a stepwise process to capture larger and larger areas with each successive expansion. In such embodiments, search seeds for subsequent iterations are based on results from previous iterations. In an example embodiment, the system identifies the record corresponding to the smallest item (smallest R-value) from a previous search and generates a new seed for a further search based on the area corresponding to the item. The search seed may, for example, be set equal to the area corresponding to the item or some multiple thereof. In a specific example embodiment the system doubles the dimensions of the boundary of the item to generate a new search seed.

For example, if the 1:50,000 NTS map sheet for Prince George, British Columbia, Canada is identified as the smallest item in a result set for a search using a point as a search seed, the stepwise search method may double the width and height of the polygon corresponding to that map sheet to create a new search seed using a polygon instead of a point. All records intersecting with this new search seed would be obtained and new result set provided.

Figure 15:
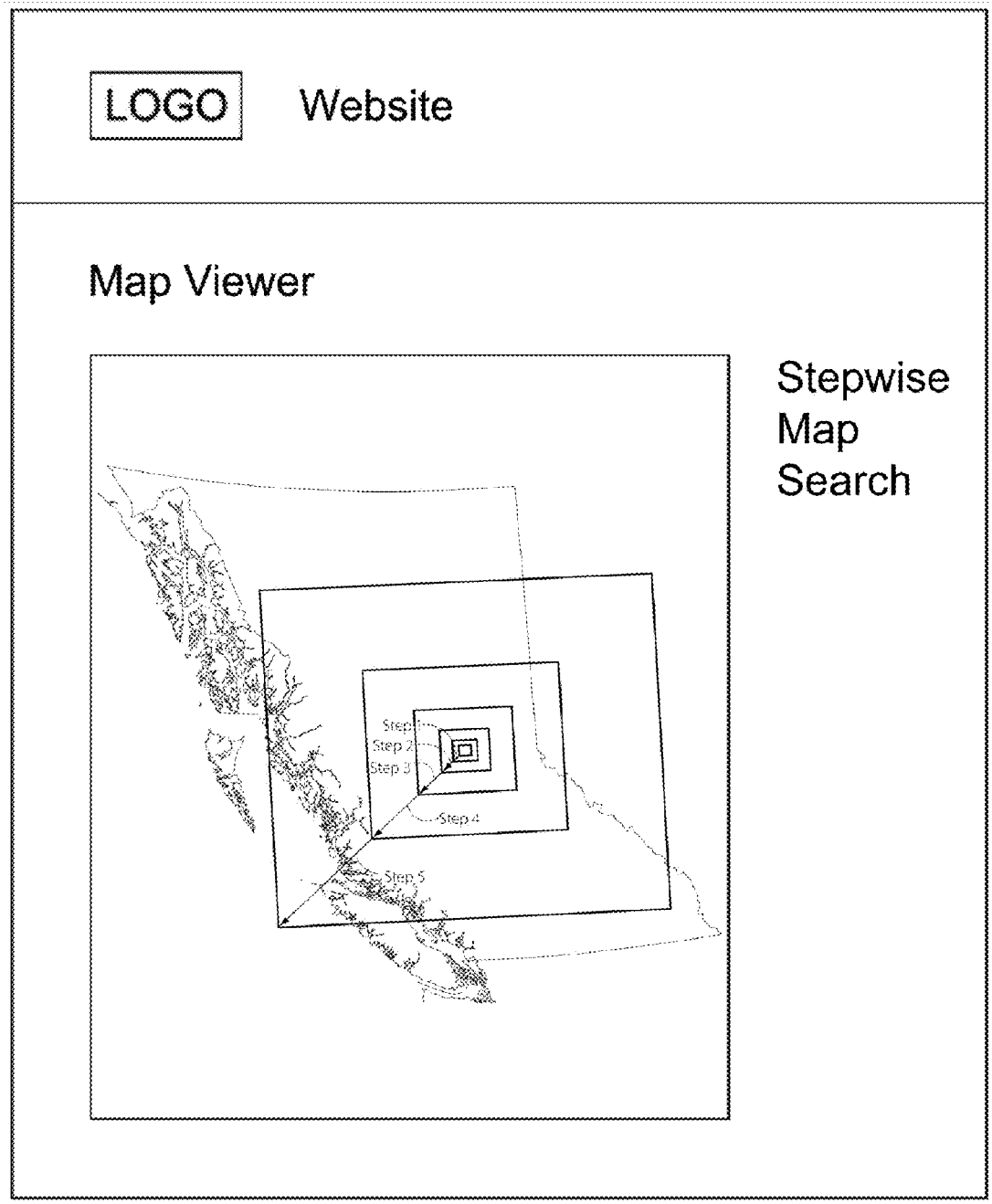
FIG. 15 illustrates a stepwise seed expansion process.

In some embodiments, the area associated with the smallest item located in the initial iteration of the search is multiplied by some factor and used as a seed for each subsequent iteration of the search. In some embodiments the factor may be, for example, in the range of 1.25 to 3. A factor of 2 tends to work reasonably well in many cases. This is illustrated in FIG. 15. FIG. 15 shows how the stepwise, iterative nature of this search method can allow more and more items to be captured in every successive search.

Table 5 shows results of a stepwise seed expansion.

TABLE 5

| | RANK | | |
|---|---|---|---|
| | First | Second | Third |
| SEED<br>~900 km$^2$<br>$R_{zoom} = 30$ | Record 1<br>R = 30 | Record 2<br>R = 121 | Record 3<br>R = 949 |
| Step 1<br>~3600 km$^2$<br>$R_{zoom} = 60$ | Record 1<br>R = 30 | Record 2<br>R = 121 | Record 3<br>R = 949 |
| Step 2<br>~14500 km$^2$<br>$R_{zoom} = 120$ | Record 2<br>R = 121 | Record 1<br>R = 30 | Record 3<br>R = 949 |
| Step 3<br>~58100 km$^2$<br>$R_{zoom} = 241$ | Record 2<br>R = 121 | Record 1<br>R = 30 | Record 3<br>R = 949 |
| Step 4<br>~232600 km$^2$<br>$R_{zoom} = 432$ | Record 2<br>R = 121 | Record 1<br>R = 30 | Record 3<br>R = 949 |
| Step 3<br>~930400 km$^2$<br>$R_{zoom} = 965$ | Record 3<br>R = 949 | Record 2<br>R = 121 | Record 1<br>R = 30 |

Expanding the area covered by a search seed can increases the number of records obtained from the query. Other techniques may also be used to expand the search area. For example, a search seed consisting of a point may be expanded to an area, which may comprise a polygon, in a suitable manner, for example, by including in the area all points that are within a radius of the point. This area, once established, may be expanded in successive iterations as described above. As another example, a seed comprising a line may be expanded to cover an area surrounding the line. All of these serve to expand the areal coverage of the seed so that more records may be obtained.

Example Applications

Figure 16:
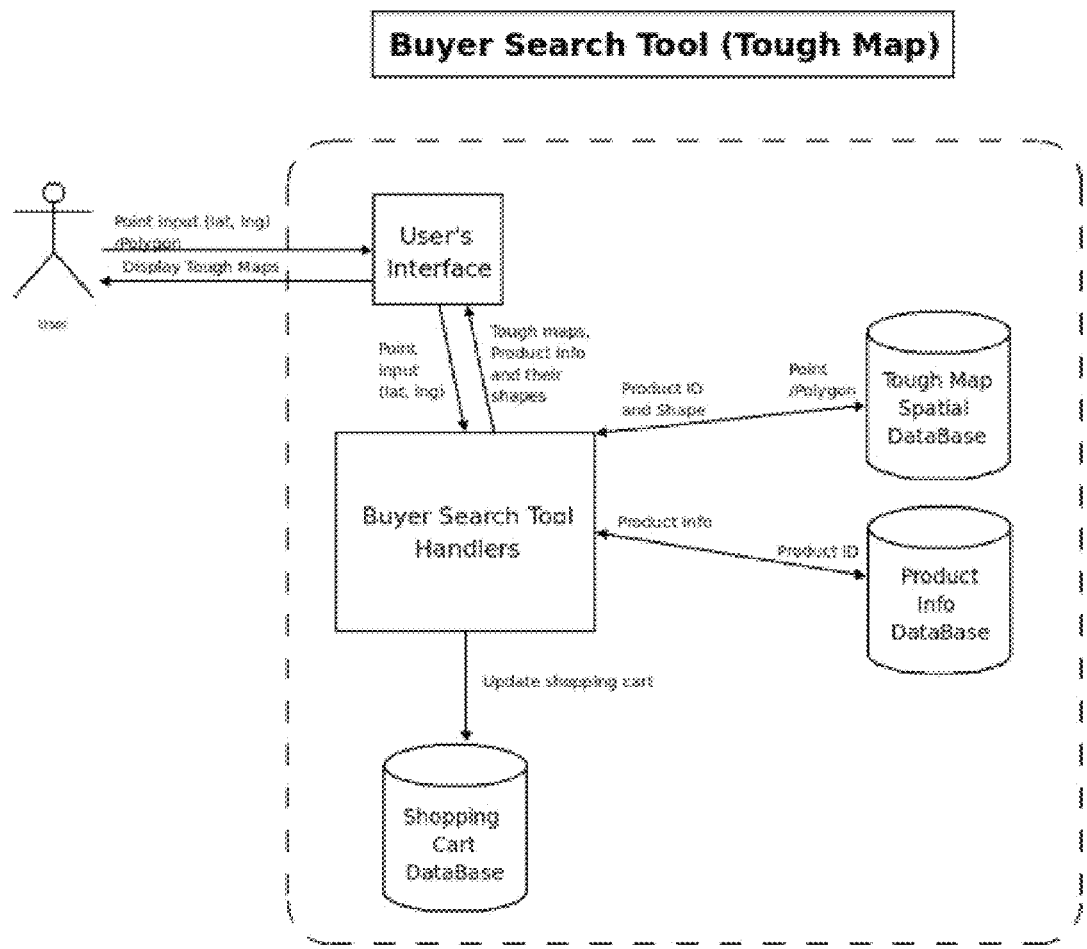
FIG. 16 is a block diagram illustrating functional components of an example map vending system.
Figure 16A:
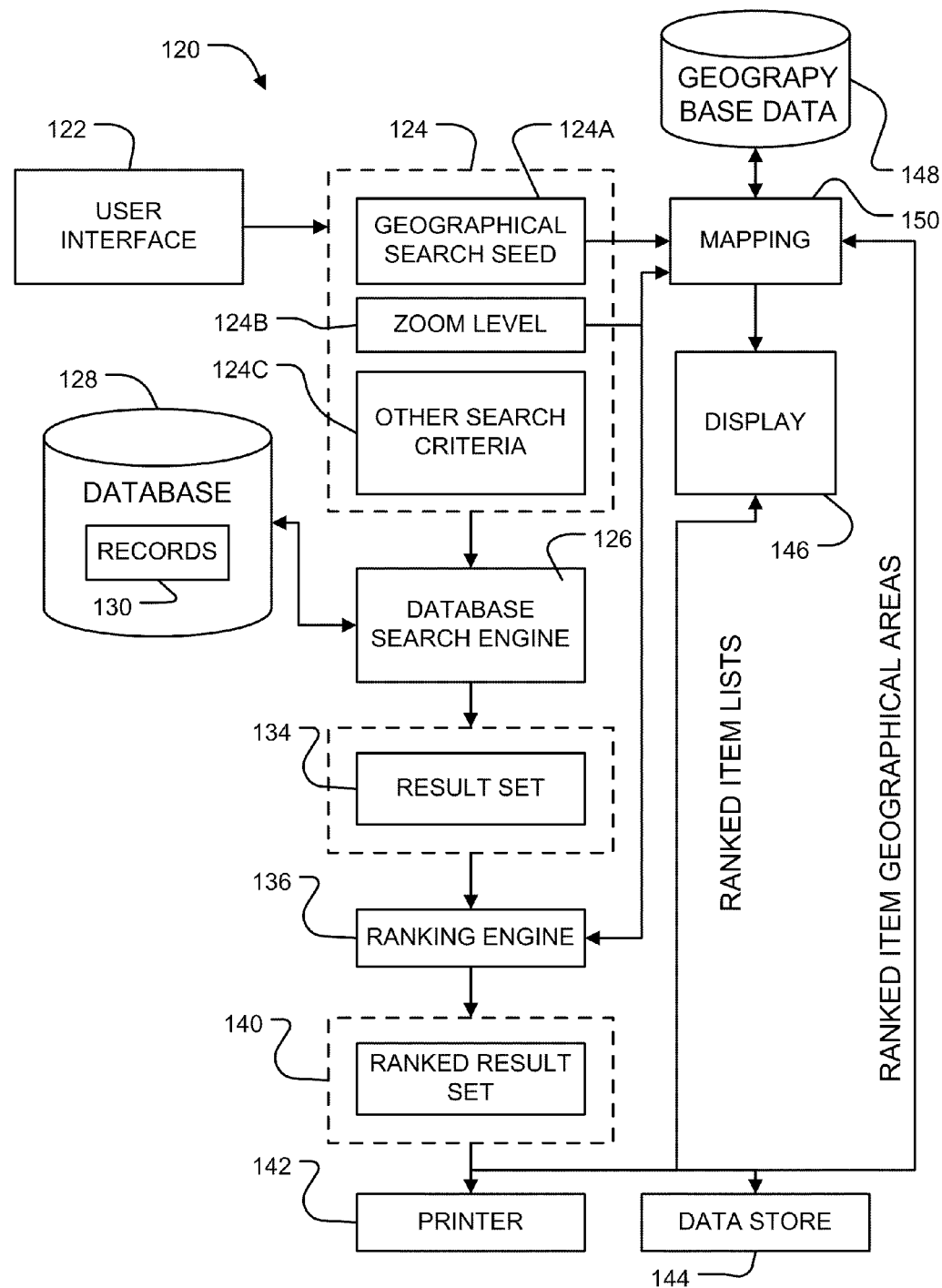
FIG. 16A is a block diagram of an example search and ranking system.

Technology as described herein may be applied to catalogue and organize an inventory of maps. For example, the technology may be applied to allow users to select maps for viewing and/or purchase. The technology may be provided in a system having a web-based front end to receive search requests and provide search results. Locally based advertising may be provided as the search technology enables advertisers to target users who are searching for information for a specific geographic area. FIG. 16 illustrates how map search technology as described herein may be integrated into a map store, providing an easy way to find and purchase maps and geospatial data. FIG. 16A illustrates another example embodiment.

System 120 has a user input 122 that a user can use to generate search criteria 124 comprising a search seed 124A and optionally a zoom level 124B and other search criteria 124C. A search engine 126 executes searches against a database 128 containing records 130 relating to items such as, for example, maps, geospatial data sets, or the like. The search engine 126 produces a result set 134 which is received by a ranking engine 136. Ranking engine 136 ranks the items of result set 134 as described herein. In the illustrated embodiment, ranking engine 136 is connected to receive zoom level 124B. A ranked result set 140 is produced. Ranked result sets may be printed on a printer 142, stored in a data store 144 or displayed on a display 146.

In the illustrated embodiment, a mapping system 150 can display locations and areas on display 146 from geography base data 148. Mapping system 150 may, for example, display locations, lines, or areas corresponding to a search seed superposed on geographical base data. Zoom level 124B may control the geographical area mapped to display 146. Mapping system 150 may also display areas corresponding to items in the ranked result set. Lists of items from the ranked result set may also be displayed on display 146.

Like maps, advertisements may be associated with geographical areas. A user-initiated search seed may be used as a basis for a query to locate advertisements relevant to the location(s) defined by the search seed. R-values may be specified for advertisements in a manner analogous to R-valves for geospatial data sets. Technology as described herein may be applied to deliver advertisements that relate to a very specific geographical location or advertisements that relate to a larger geographical area based in part on a zoom level as described above.

Figure 17:
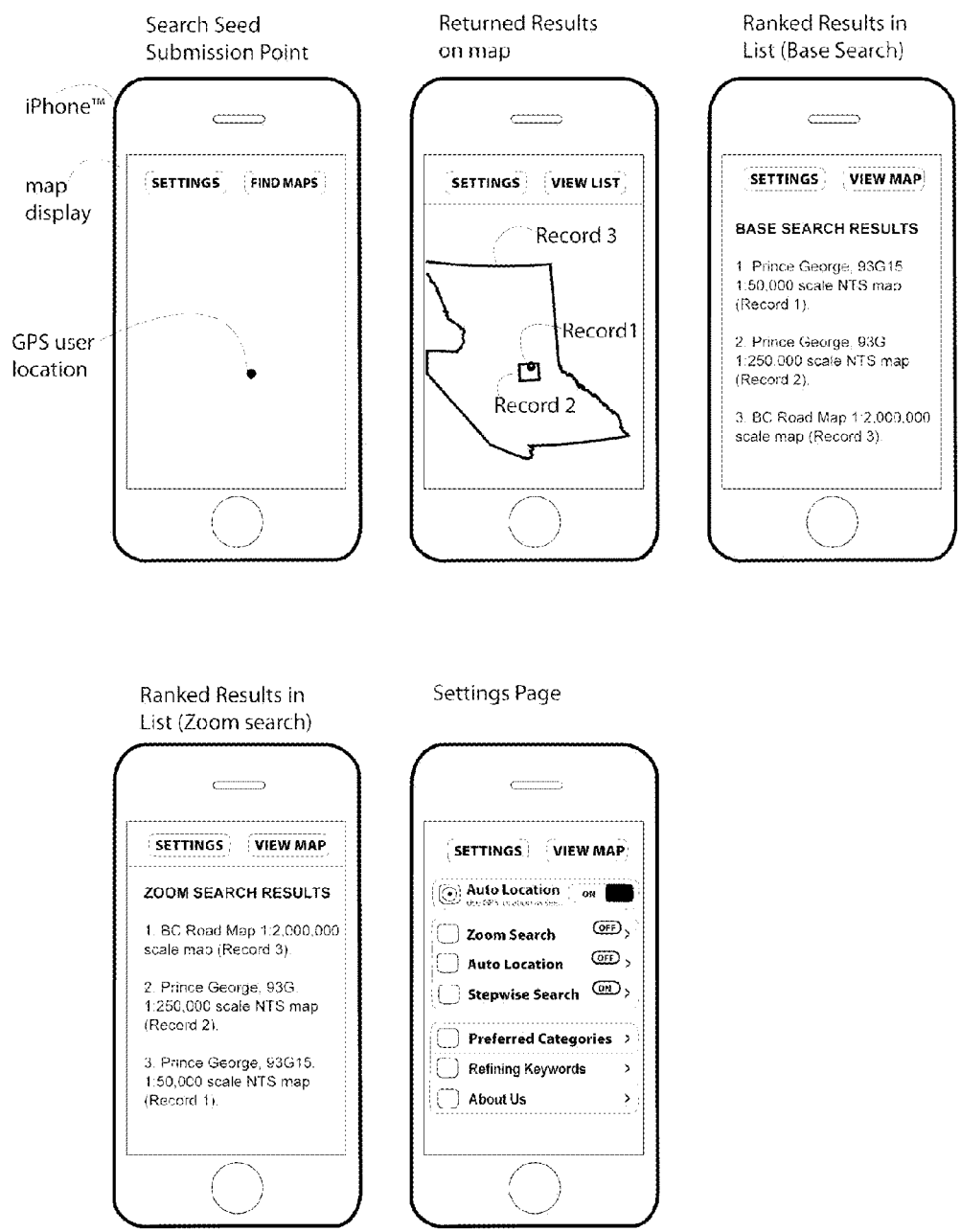
FIG. 17 illustrates an example search tool for use with mobile data appliances such as smart phones.

The technology described here is well suited for use on mobile devices, such as a Blackberry™, iPhone™ and other smart phones that can connect to the internet or other online resources. FIG. 17 illustrates an iPhone™ application. Using the iPhone's GPS, a search seed is submitted through the internet and the search method described above extracts relevant records and ranks them as described above.

The results are then sent back to the iPhone and displayed, for example as a list or another representation provided in the application. FIG. 17 also illustrates how the search tool can be tailored to specific types of search seeds and preselecting categories and keywords to refine the search results.

A social networking application may allow users to search for and then share maps and geospatial data.

Technology as described above may be applied within an institution for managing maps and other items. Some non-limiting example applications include:

Governments: Maps and geospatial data are commonly used by all levels of government for identifying property boundaries, locating services, showing recreation opportunities, planning, etc. The technology described here provides an efficient and easy way to catalogue and search for all their maps and geospatial information. The tool can be integrated into existing intranet, through their mobile devices or expanded online to assist residents searching for municipal maps and geospatial data.

Resource Companies: Maps and geospatial data are critical to the work of these companies (as well as their consultants and contractors). This technology provides a way to organize the large volumes of maps and geospatial data used for planning cutblocks, road construction, reforestation, environmental analysis, etc.

Police/Search and Rescue: Maps are frequently needed when police or search and rescue teams need to find someone or someplace. This technology can be used by these organizations to quickly find maps for areas, which is often a challenge when an emergency call comes in and the team needs maps and geospatial data immediately.

Tourism Associations: Maps and geospatial data are frequently used by travelers when visiting new areas, and this technology can be used by tourism associations to efficiently organize and distribute maps for all types of activities.

Utility Companies: Maps and geospatial data are managed to track locations of above-ground and underground pipes, wires and other utility hardware. These have varying scales.

Media Companies: Maps may be used by media companies to promote or advertise businesses or locations of interest.

From the foregoing description it can be appreciated that some embodiments of this invention can provide advantages such as:

more meaningful results for map and geospatial queries.
applicability across multiple platforms.
a final rank value may provide results most closely related to the location of the search seed.
searches may be provided which expand out from an initial search seed to include records relating to nearby areas in the result set.
items such as printed maps and geospatial data may both be located with the same query.
additional items such as advertisements or other information pertaining to the locations corresponding to a search seed may optionally also be retrieved and delivered to a user.
users may carry out stepwise searches and refinements from original search results to help them efficiently find items such as appropriate map(s) and geospatial data.

It is not mandatory that any specific embodiment provide any or all of these advantages.

Certain implementations of the invention comprise computer processors which execute software instructions which cause the processors to perform a method of the invention. For example, one or more processors in an automated map cataloguing system may implement the methods of FIG. 1 or 7 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Some embodiments provide a mechanism for re-ranking the items in a result set based on different zoom levels. In some such embodiments, a user may obtain a result set and then select a zoom level using a suitable user interface. As the zoom level is changed, the user may observe changes in the highest-ranked items in the result set. In some embodiments, different location dependent information, which may include advertisements, may be displayed with the highest-ranked items in the search set.

embodiments as described herein may be modified by deleting features that are not required for operation and/or by adding features that are described in relation to other embodiments.

Any of the embodiments described herein may be made backward compatible for use with queries which do not specify a geography-based search seed. For example, where a geographic search seed is not provided searches may be executed based upon keywords or other data. The search results may still be ranked based at least in part upon R-values for items represented in the search result set. The ranking may be done setting $R_{zoom}$ to zero, which will result in the highest resolution results appearing first when the result set is made available to a user.

Features of any of the embodiments described herein may be, modified, combined in other permutations, applied in combination with other features, added to applied in sub-combinations or the like.

It is therefore intended that the following appended claims and claims hereafter introduced are interpreted to include all such modifications, permutations, additions and sub-combinations as are within their true spirit and scope.

What is claimed is:

1. A method for providing a result set to a user, the result set comprising a plurality of database records, the records of the result set identifying a corresponding plurality of items, the plurality of items comprising one or both of maps and geospatial datasets, each of the plurality of items corresponding to a geospatial region represented by the item and comprising geospatial information relating to the geospatial region represented by the item, the database record for each of the plurality of items comprising information regarding the geospatial region represented by the item, the method comprising, in a programmed computer:

obtaining the result set;
by the computer, obtaining sizes of the geospatial regions represented by each of the plurality of items using the information in the database records regarding the geospatial regions represented by the plurality of items;
by the computer, obtaining a zoom level controllable by the user;
determining by the computer an order for the plurality of items in the result set based at least in part on the sizes of the geospatial regions represented by the plurality of items and on a size associated with the zoom level such that records in the result set corresponding to items of the plurality of items for which the sizes of the associated geospatial regions more closely match the size associated with the zoom level are ordered before records for which the sizes of the associated geospatial regions less closely match the size associated with the zoom level; and displaying the result set to the user on a display with the items ordered in the determined order.

2. A method according to claim 1 wherein the records each comprise a value indicative of the size of the corresponding geographical region and determining an order for the items comprises sorting the records according to the value.

3. A method according to claim 1 comprising calculating sizes of the corresponding geospatial regions from data in the records defining the geospatial regions wherein determining an order for the items comprises sorting the records according to the calculated values.

4. A method according to claim 1, wherein determining an order for the items in the result set is based at least in part on scales associated with the corresponding geospatial regions.

5. A method according to claim 4 wherein the database records comprise scales corresponding to the items.

6. A method according to claim 4 comprising determining scale factors for the items based upon statistics regarding the spacing between geographical features represented by the items.

7. A method according to claim 6 wherein the items comprise maps and the statistics comprise median distances between features depicted in the maps.

8. A method according to claim 1 comprising receiving a user selection of the zoom level from among a plurality of preset zoom levels.

9. A method according to claim 1 comprising receiving user input, based on the user input displaying a portion of a map on a display and determining the zoom level based at least in part on an extent of the displayed portion of the map.

10. A method according to claim 1 wherein obtaining the result set comprises performing a search of a database using a search seed comprising a defined geographical area wherein the zoom level is determined based on the size of the geographical area of the search seed.

11. A method according to claim 1 wherein the sizes comprise measures derived from geospatial volumes corresponding to the items.

12. A method according to claim 1 wherein the items comprise advertisements.

13. A method according to claim 1 wherein obtaining the result set comprises:
 obtaining a search seed, the search seed comprising at least one geospatial location, line or area; and
 intersecting the search seed with the geospatial regions corresponding to the records in the database.

14. A method according to claim 13 wherein obtaining a search seed comprises retrieving a location of a GPS-enabled portable device.

15. Apparatus for providing a result set to a user, the result set comprising records identifying a plurality of items, the items comprising maps, geospatial datasets or both maps and geospatial datasets, each of the plurality of items corresponding to a geospatial region represented by the item and comprising geospatial information relating to the geospatial region represented by the item, the records for each of the plurality of items comprising information regarding the geospatial region represented by the item, the apparatus comprising:
 a user interface operable by a user to specify a zoom level;
 a ranking facility configured to generate an order for the plurality of records of a result set using the information from the records regarding the geospatial regions represented by the plurality of items, the order based at least in part on sizes of the geospatial regions associated with the plurality of items of the result set and on a size associated with the zoom level such that records in the result set corresponding to items of the plurality of items for which the sizes of the associated geospatial regions more closely match the size associated with the zoom level are ordered before records for which the sizes of the associated geospatial regions less closely match the size associated with the zoom level.

16. Apparatus according to claim 15 comprising a display connected to display indicia corresponding to the catalogued items of the result set in the order generated by the ranking facility wherein the display comprises a display of a mobile device.

17. Apparatus according to claim 15 comprising a web server connected to transmit signals to a remote web browser in order to cause the remote web browser to display indicia corresponding to the catalogued items of the result set according to the order generated by the ranking facility.

18. Apparatus according to claim 17 wherein the web server is configured to generate and transmit for viewing at the remote web browser a view of map marked with indicia corresponding to the catalogued items of the result set, the indicia at locations corresponding to the geospatial regions, wherein the order is indicated by shading of the indicia.

19. Apparatus according to claim 15 comprising a display wherein the apparatus is configured to generate and display on the display indicia corresponding to the catalogued items of the result set.

20. Apparatus according to claim 19 wherein the apparatus is configured to generate and display on the display a view of map marked with the indicia corresponding to the catalogued items of the result set, the indicia at locations corresponding to the geospatial regions, wherein the order is indicated by shading of the indicia.

21. Apparatus according to claim 19 wherein the indicia comprise text.

* * * * *